US006925444B1

(12) United States Patent
McCollom et al.

(10) Patent No.: US 6,925,444 B1
(45) Date of Patent: *Aug. 2, 2005

(54) SYSTEM AND METHOD FOR CREATING AND SHARING PURCHASING LISTS ON A NETWORK

(75) Inventors: William Girard McCollom, Ft Collins, CO (US); Robert King Ables, Drake, CO (US); Jacqueline Ann Bray, Fort Collins, CO (US); Carolyn Soberalske Cotten, Hotchkiss, CO (US); Martin Robert Fink, Fort Collins, CO (US); Shane Douglas Meyer, Windsor, CO (US); Silvi Kiisk Steigerwald, Fort Collins, CO (US)

(73) Assignee: Hewlett-Packard Development Company, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 386 days.

(21) Appl. No.: 09/204,018

(22) Filed: Dec. 1, 1998

Related U.S. Application Data

(63) Continuation-in-part of application No. 09/151,498, filed on Sep. 11, 1998, now Pat. No. 6,343,274, and a continuation-in-part of application No. 09/149,755, filed on Sep. 8, 1998, now Pat. No. 6,266,058.

(51) Int. Cl.[7] .............................................. G06F 19/00
(52) U.S. Cl. ...................................................... 705/14
(58) Field of Search ............................. 705/26, 14, 27; 380/24, 25; 235/380; 707/65; 706/65, 16, 26, 20, 77, 76

(56) References Cited

U.S. PATENT DOCUMENTS 4,703,423 A * 10/1987 Bado et al. .................... 705/14
5,250,789 A * 10/1993 Johnsen ......................... 705/14
5,619,574 A    4/1997 Johnson et al. ............... 380/25

(Continued)

FOREIGN PATENT DOCUMENTS

| EP | 0822535 A2 | 4/1998 |
| WO | WO00/04434 | * 1/2000 |
| WO | WO 00/05684 | 2/2000 |

OTHER PUBLICATIONS

"VODOFONE; Vodofone Retail Launches 'on–line' communications store." Presswire Aug. 13, 1998 p.1.*
2Market, Too Cool: Interactive shopping services available "HFN" (Home Furnishing Network) (Mar. 6, 1995) v. 69, n. 10, p. 61[pp. 1–3].*
Campbell, Lisa, "Net Worth: Internet Advertising", Marketing, May 28, 1998, p. 39(4).
eToys website: http://www .eToys.com.
H.O.T.! Coupons web site: http://www .hotcoupons.com.
Mosley–Matchett, J.D. "'Eyeball' the validity of the Internet ad measures." Marketing New s, vol. 31, No. 10, pp. 28–29, May 12, 1997.

*Primary Examiner*—John Leonard Young

(57) ABSTRACT

A system and method create and share purchasing lists in a network system. The system and method utilize a consumer user interface. The consumer user interface provides the consumer the ability to create a purchase list by receiving advertisement data on the consumer device, selecting an item desired for purchase, identifying the purchase list for the item to be saved, creating the purchase list if the purchase list identified does not exist, and saving the item to the identified purchase list. The consumer user interface further provides the consumer the ability to share a purchase list by identifying a purchase list to be shared, converting the purchase list to the appropriate format, identifying a recipient of the purchase list, and transmitting the purchase list to the recipient.

30 Claims, 26 Drawing Sheets

U.S. PATENT DOCUMENTS

| | | | |
|---|---|---|---|
| 5,692,132 A | | 11/1997 | Hogan .......................... 395/227 |
| 5,710,884 A | | 1/1998 | Dedrick ................. 395/200.47 |
| 5,710,887 A | | 1/1998 | Chelliah et al. ............. 395/226 |
| 5,724,424 A | | 3/1998 | Gifford ......................... 380/24 |
| 5,724,521 A | | 3/1998 | Dedrick ....................... 395/226 |
| 5,732,400 A | * | 3/1998 | Mandler et al. ............... 705/26 |
| 5,745,681 A | * | 4/1998 | Levine et al. ................ 709/200 |
| 5,754,938 A | | 5/1998 | Herz et al. ................... 455/4.2 |
| 5,754,939 A | | 5/1998 | Herz et al. ................... 455/4.2 |
| 5,754,981 A | * | 5/1998 | Veeneman et al. ............ 705/26 |
| 5,761,649 A | * | 6/1998 | Hill .............................. 705/27 |
| 5,761,662 A | | 6/1998 | Dasan ......................... 707/10 |
| 5,794,210 A | | 8/1998 | Goldhaber et al. ........... 705/14 |
| 5,794,234 A | | 8/1998 | Church et al. ................. 707/4 |
| 5,799,284 A | | 8/1998 | Bourquin ..................... 705/26 |
| 5,828,837 A | | 10/1998 | Eikeland ................ 395/200.32 |
| 5,850,442 A | * | 12/1998 | Muftic ......................... 705/65 |
| 5,855,007 A | | 12/1998 | Jovicic et al. ................ 705/14 |
| 5,862,325 A | | 1/1999 | Reed et al. ............ 395/200.31 |
| 5,875,296 A | | 2/1999 | Shi et al. ............... 395/188.01 |
| 5,883,810 A | | 3/1999 | Franklin et al. ....... 364/479.02 |
| 5,889,863 A | * | 3/1999 | Weber .......................... 380/25 |
| 5,903,882 A | | 5/1999 | Asay et al. ................... 705/44 |
| 5,905,973 A | * | 5/1999 | Yonezawa et al. ............ 705/27 |
| 5,907,830 A | | 5/1999 | Engel et al. .................. 705/14 |
| 5,909,492 A | * | 6/1999 | Payne et al. .................. 705/78 |
| 5,933,811 A | * | 8/1999 | Angles et al. ................... 5/14 |
| 5,937,390 A | | 8/1999 | Hyodo ......................... 705/14 |
| 5,946,665 A | | 8/1999 | Suzuki et al. ................. 705/26 |
| 5,948,061 A | | 9/1999 | Merriman et al. .......... 709/219 |
| 5,950,173 A | * | 9/1999 | Perkowski ................... 705/26 |
| 5,956,709 A | | 9/1999 | Xue ............................. 707/3 |
| 5,963,915 A | | 10/1999 | Kirsch ......................... 705/26 |
| 5,970,472 A | * | 10/1999 | Allsop et al. ................. 705/26 |
| 5,970,474 A | * | 10/1999 | LeRoy et al. ................. 705/27 |
| 5,970,475 A | | 10/1999 | Barnes et al. ................. 705/27 |
| 5,974,396 A | | 10/1999 | Anderson et al. ............. 705/10 |
| 5,974,451 A | * | 10/1999 | Simmons ................... 709/218 |
| 5,983,199 A | * | 11/1999 | Kaneko ....................... 705/26 |
| 5,987,132 A | * | 11/1999 | Rowney ....................... 380/24 |
| 5,999,912 A | | 12/1999 | Wodarz et al. ................ 705/14 |
| 5,999,914 A | | 12/1999 | Blinn et al. ................... 705/26 |
| 6,006,197 A | | 12/1999 | d'Eon et al .................. 705/10 |
| 6,009,410 A | | 12/1999 | LeMole et al. ................ 705/14 |
| 6,014,634 A | * | 1/2000 | Scroggie et al. .............. 705/14 |
| 6,016,504 A | * | 1/2000 | Arnold et al. ............. 709/200 |
| 6,026,369 A | | 2/2000 | Capek ......................... 705/14 |
| 6,029,195 A | | 2/2000 | Herz .......................... 709/219 |
| 6,032,130 A | * | 2/2000 | Alloul et al. ................. 705/27 |
| 6,041,309 A | | 3/2000 | Laor ............................ 705/14 |
| 6,058,373 A | * | 5/2000 | Blinn et al. ................... 705/26 |
| 6,070,798 A | * | 6/2000 | Nethery ................. 235/462.01 |
| 6,076,069 A | | 6/2000 | Laor ............................ 705/14 |
| 6,119,101 A | | 9/2000 | Peckover ..................... 705/26 |
| 6,134,532 A | | 10/2000 | Lazarus et al. ............... 705/14 |
| 6,247,047 B1 | | 6/2001 | Wolff ......................... 709/219 |
| 2001/0001145 A1 | | 5/2001 | Barnett et al. ................ 705/14 |

* cited by examiner

FIG. 2

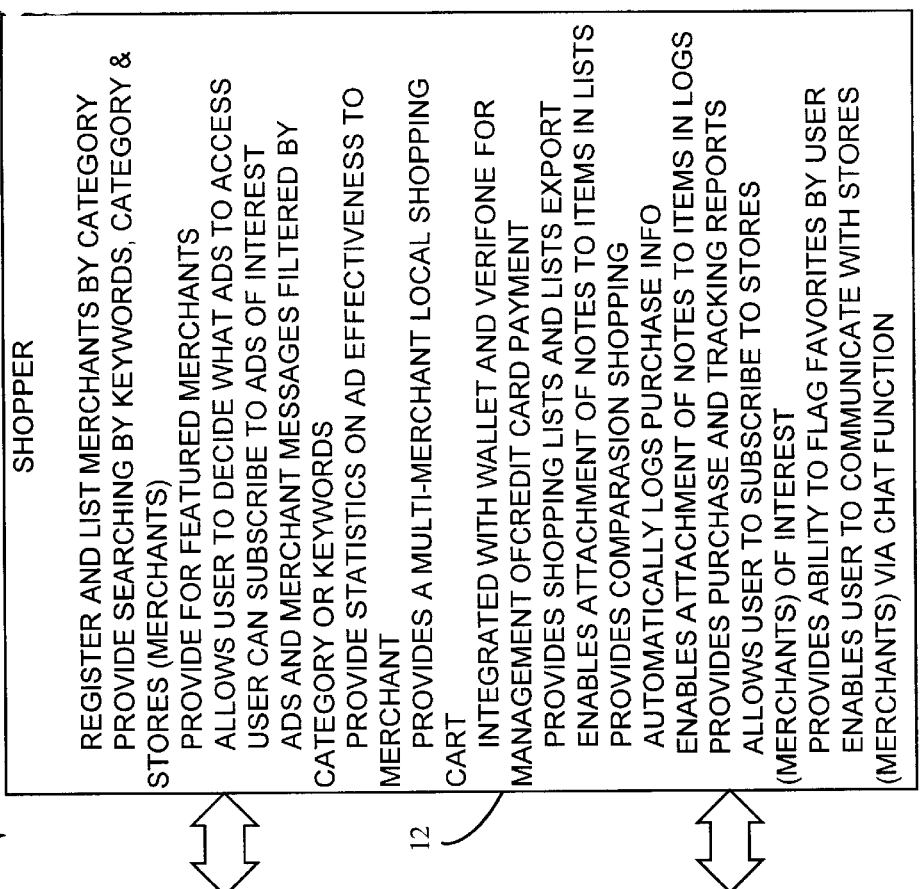

COMMERCE SERVER (23)
- CENTRAL SITE FOR MERCHANT INFO AVAILABLE TO USERS
- DETERMINE HOW MANY MERCHANT ADDS & KEYWORDS, AND FEATURED MERCHANT
- INTERFACE FOR MERCH. REGISTRATION, ACCOUNTS MANAGEMENT & REPORTS
- KEEPS LATEST AD INFO FOR USER TO ACCESS
- SUPPORTS SEARCHING OF MERCH/ADS BASED ON KEYWORDS, STORE NAMES & COUPONS
- TRACK USER AD ACCESS STATISTICS

SHOPPER (12)
- REGISTER AND LIST MERCHANTS BY CATEGORY
- PROVIDE SEARCHING BY KEYWORDS, CATEGORY & STORES (MERCHANTS)
- PROVIDE FOR FEATURED MERCHANTS
- ALLOWS USER TO DECIDE WHAT ADS TO ACCESS
- USER CAN SUBSCRIBE TO ADS OF INTEREST ADS AND MERCHANT MESSAGES FILTERED BY CATEGORY OR KEYWORDS
- PROVIDE STATISTICS ON AD EFFECTIVENESS TO MERCHANT
- PROVIDES A MULTI-MERCHANT LOCAL SHOPPING CART
- INTEGRATED WITH WALLET AND VERIFONE FOR MANAGEMENT OF CREDIT CARD PAYMENT
- PROVIDES SHOPPING LISTS AND LISTS EXPORT
- ENABLES ATTACHMENT OF NOTES TO ITEMS IN LISTS
- PROVIDES COMPARASION SHOPPING
- AUTOMATICALLY LOGS PURCHASE INFO
- ENABLES ATTACHMENT OF NOTES TO ITEMS IN LOGS
- PROVIDES PURCHASE AND TRACKING REPORTS
- ALLOWS USER TO SUBSCRIBE TO STORES (MERCHANTS) OF INTEREST
- PROVIDES ABILITY TO FLAG FAVORITES BY USER
- ENABLES USER TO COMMUNICATE WITH STORES (MERCHANTS) VIA CHAT FUNCTION

MERCHANT (26)
- ENABLE USER MULTI-MERCH SHOPPING CART
- ENABLE USER PURCHASE/TRANSACTION LOG
- PUBLISH ADS TO COMMERCE SERVER VIA WWW
- PUBLISH AND REDEEM COUPONS
- PROVIDE USER INTERFACE FOR CUST. SUPT.
- ENABLE CATALOG AND SHOPPING CART FUNCTIONS
- PROVIDE MULTI-MERCH SECURE USER PAYMENT METHOD

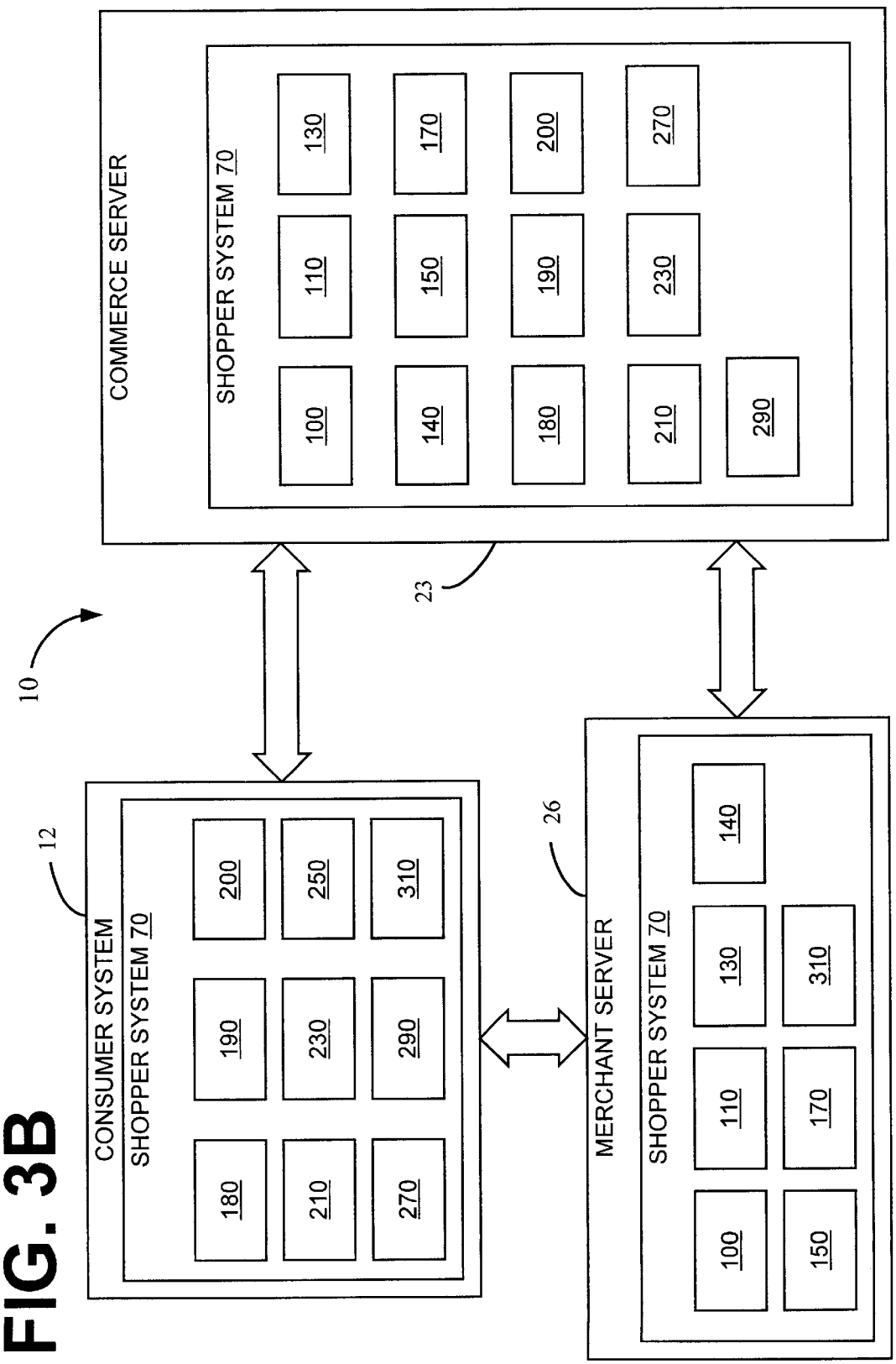

FIG. 19

FILE  EDIT  VIEW  GO  FAVORITES  HELP

BACK  FORWARD  STOP  REFRESH  HOME  SEARCH  FAVORITES  PRINT

ADDRESS : DOCUMENT.DOC

340

| STORE 341 | AD DESCRIPTION 342 | ISSUED 343 | EXPIRES 344 |
|---|---|---|---|
| THE DIZZY STORE ONLINE | ITEMS ON SALE FOR 50% OFF | 5/1/98 | 12/1/98 |
| BARNES AND MOBLE | SUMMER BOOK BLAST | 5/1/98 | 8/1/98 |
| 1 800 FLOWERS | SPECIAL SPRING BOUQUET | 4/1/98 | 6/1/98 |

ADVERTISMENT 345

BOOK #1
BY MS. YYY
PRICE $ XX.XX

BOOK #2
BY MS. YYY
PRICE $ XX.XX

BOOK #3
BY MS. YYY
PRICE $ XX.XX

STORES  SPECIALS  IDEAS  PURCHASES  SHOPPING CART

FIG. 23

| NOTE 381 | DATE 382 | MERCHANT 383 | COST 384 | DESCRPTION 385 | CREDIT CARD 386 |
|---|---|---|---|---|---|
| ✓ | 4/1/98 | MICRO WAREHOUSE | 479.95 | NEC 1280X1024@65HZ | CORP. AMEX |
| | 3/23/98 | SONY | 529.00 | HARMONY SCREEN | PERSONAL AMEX |
| | 3/22/98 | PCZONE | 399.95 | VIEWSONIC | PERSONAL VISA |

SYSTEM AND METHOD FOR CREATING AND SHARING PURCHASING LISTS ON A NETWORK

CROSS REFERENCE TO RELATED APPLICATION

This application is a continuation-in-part of application entitled "Apparatus and Method for a Merchant-to-Consumer Advertisement Communication System," Ser. No. 09/151,498, filed Sep. 11, 1998 now U.S. Pat. No. 6,343,274, and application entitled "Apparatus and Method for Linking Browser Bars With Active Documents for a Browser," Ser. No. 09/149,775, filed Sep. 8, 1998 now U.S. Pat. No. 6,266,058, and incorporated herein by reference.

This application is related to co-pending applications entitled "System and Method for a Distributed Electronic Payment System," Ser. No. 09/203,251, filed Dec. 1, 1998, "System and Method for a Client-Based Electronic Shopping Cart System," Ser. No. 09/203,246, filed Dec. 1, 1998, "System and Method for an Integrated Electronic Purchasing Shopper System," Ser. No. 09/203,999, filed Dec. 1, 1998, "System and Method for Publishing, Distributing and Redeeming Coupons on a Network," Ser. No. 09/203,247, filed Dec. 1, 1998, now pending and incorporated herein by reference.

BACKGROUND OF THE INVENTION

1. Field of the Invention

The present invention generally relates to computers and software, and more particularly, to a system and method for creating and sharing purchasing lists in a network system.

2. Related Art

As known in the art, the Internet is a world-wide collection of networks and gateways that use the Transmission Control Protocol/Internet Protocol suite of protocols to communicate with one another. At the heart of the Internet is a backbone of high speed data communication lines between major nodes or host computers consisting of thousands of commercial, government, educational, and other computer systems that route data and messages.

World Wide Web (WWW) refers to the total set of interlinked hypertext documents residing on hypertext transfer protocol (HTTP) servers all around the world. Documents on the WWW, called pages or web pages, are written in hypertext mark-up language (HTML) identified by uniform resource locators (URL) that specify the particular machine and pathname by which a file can be accessed and transmitted from node to node to the end user under HTTP. A web site is a related group of these documents and associated files, scripts, subprocedures, and databases that are served up by an HTTP server on the WWW.

Users need a browser program and an Internet connection to access a web site. Browser programs, also called "web browsers," are consumer applications that enable a user to navigate the Internet and view HTML documents on the WWW, another network, or the user's computer. Web browsers also allow users to follow codes called "tags" embedded in an HTML document, which associate particular words and images in the document with URLs so that a user can access another file that may be half way around the world, at the press of a key or the click of a mouse.

One type of document that consumers access is merchant advertisements. The recent rapid growth of information applications on international public packet switch computer networks, such as the Internet, suggests that public computer networks have the potential to establish a new kind of open marketplace for goods and services. As web pages are used internationally, it is highly desirable for manufacturers and merchants to be able to advertise their goods and services to as many potential customers as possible. Currently, on the Internet the primary way to advertise is through the use of advertisement banners that consist of trademarks, text, buttons or images comprised of hyperlinks, which transport a user to a particular website to access information regarding goods and services.

Unfortunately, as the Internet provides public access to advertisements and allows purchases on a merchant's server, there is no ability for the consumer to collect and save information regarding items desired for purchase that the consumer may wish to keep organized and private. There is also a lack of ability for the consumer to share information regarding items desired for purchase with others in an organized manner.

SUMMARY OF THE INVENTION

The present invention is generally directed to a system and method for creating and sharing purchasing lists in a network system. In general, the apparatus and method are implemented as follows. A consumer device provides the consumer the ability to create a purchase list by receiving advertisement data on the consumer device, selecting an item desired for purchase, identifying the purchase list for the item to be saved, creating the purchase list if the purchase list identified does not exist, and saving the item to the identified purchase list.

In accordance with another embodiment of the present invention, the system and method also provides customers with the ability to share a purchase list by identifying a purchase list to be shared, converting the purchase list to the appropriate format, identifying a recipient of the purchase list, and transmitting the purchase list to the recipient.

In accordance with another embodiment of the present invention, the system and method also provides customers with the ability to publish purchasing list, and to receive updates the purchasing list from another on the network.

In accordance with another embodiment of the present invention, the customer is provided with a means to publish purchasing list on the commerce server via the World Wide Web.

In accordance with yet another embodiment of the present invention, the customer system keeps current purchasing lists available so that other second party customers receive only the latest purchasing lists from particular customer.

In accordance with yet another embodiment of the present invention, the consumer user interface browser program provides the consumer with a client-based electronic shopping cart mechanism to minimize network communication. This client-based electronic shopping cart mechanism constructs a list of items (i.e. a purchasing list) that the user intends to purchase in the current session or a session in the near future. The client user shopping cart stores the purchasing list information with regard to items that the user wishes to purchase on the client user system in order to provide enhanced security. The stored purchasing list information allows for user access in a user-friendly manner and can be sent to other second party customers.

In accordance with another embodiment of the present invention, the consumer user interface browser program provides the consumer with a purchasing list to manage current and future electronic purchases.

In accordance with another embodiment of the present invention, the consumer user interface browser program enables the consumer to create and share purchasing lists on a network. This enables the consumer user to construct a shopping wish list, e.g., a gift registry, for publication across the network. This gift registry provides for convenience and efficiency in operation by allowing numerous other consumers to receive the purchasing list, make purchases, and update the consumer's shopping purchasing list to reflect those items recently purchased.

All of the foregoing embodiments are believed to be separate patentable inventions and there are others not specifically listed for brevity.

BRIEF DESCRIPTION OF THE DRAWINGS

The accompanying drawings incorporated in and forming a part of the specification illustrate several aspects of the present invention, and together with the description, serve to explain the principles of the invention. Note that in the drawings, like reference numerals designate corresponding parts throughout the several views. In the drawings:

FIG. 2 is a block diagram of a commerce server, merchant server and consumer shopper system of the present invention.

FIG. 3B is a block diagram of the distributed shopper system in a commerce server, merchant server and consumer shopper system of the present invention.

FIG. 19 is an illustration of an example screen display for merchant advertisements as referenced in FIG. 13.

FIG. 23 is an illustration of an example screen display for a shopping cart mechanism as referenced in FIG. 17.

DETAILED DESCRIPTION OF THE PREFERRED EMBODIMENT

The present invention will now be described in detail with specific reference to the drawings. While the invention will be described in connection with these drawings, there is no intent to limit it to the embodiment or embodiments disclosed therein. On the contrary, the intent is to cover all alternatives, modifications, and equivalents included within the spirit and scope of the invention.

Figure 1:
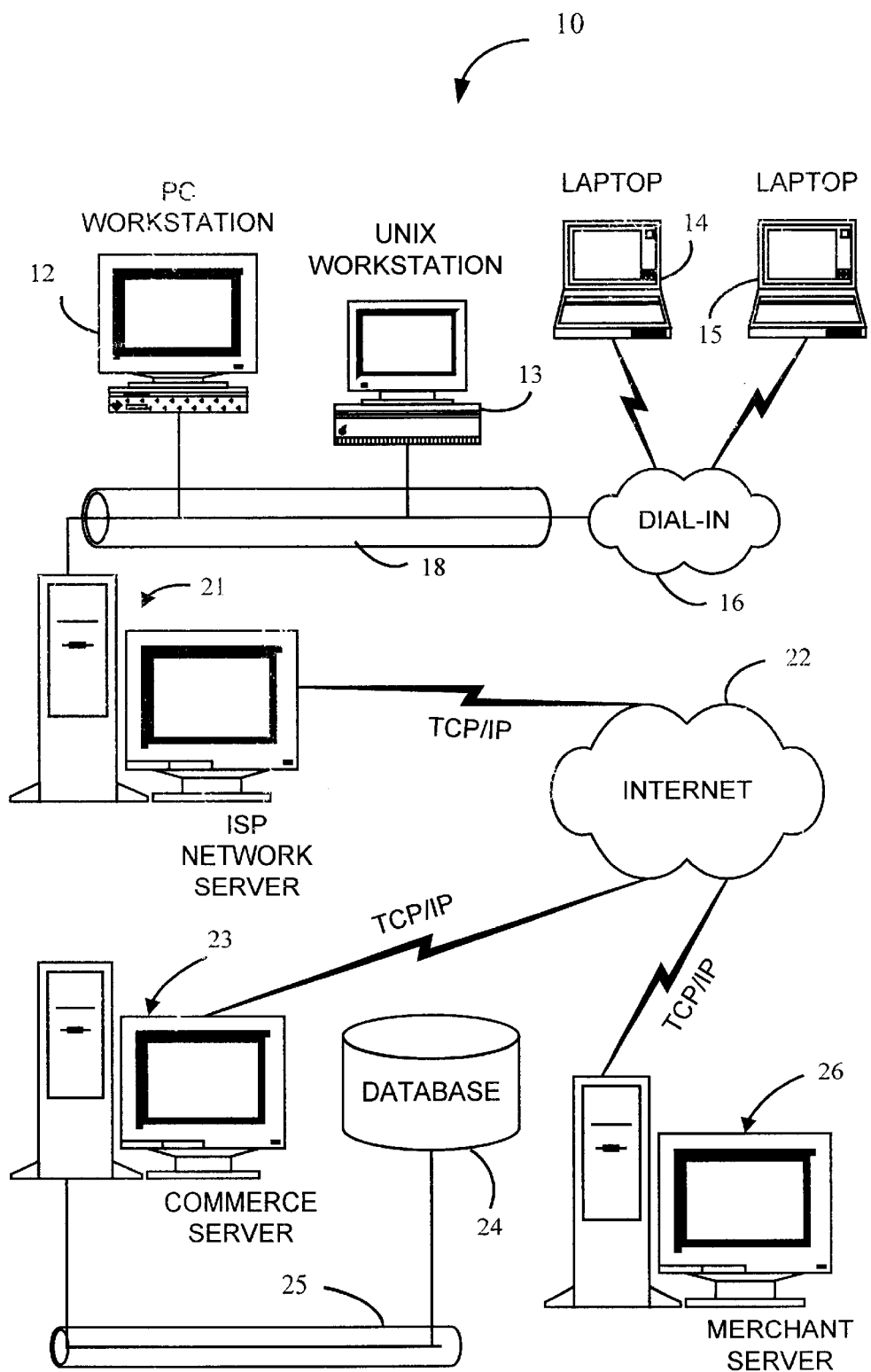
FIG. 1 is a block diagram of a consumer/server system utilizing the Internet in accordance with the present invention.

Turning now to the drawings, FIG. 1 is a block diagram of just one example of a system configuration, wherein the present invention may be implemented, that illustrates the flexibility, expandability, and platform independence of the present invention. While the system configuration could take many forms, the diagram of FIG. 1 illustrates a plurality of diverse consumer workstations 12 and 13, directly connected to a network, for example, but not limited to, a local area network (LAN) 18. Additional workstations 14 and 15 may similarly be remotely located and in communication with the network 18 through a dial-in or other suitable connection 16. Each of the workstations 12, 13, 14 and 15 in FIG. 1 are illustrated to emphasize that the system workstations may comprise a diverse hardware platform.

As is well known, browser applications are provided and readily available for a variety of hardware platforms. Browsers are most commonly recognized for their utility for accessing information over the Internet 22. As aforementioned, a browser is a device or platform that allows a user to view a variety of service collections. The browser retrieves information from a network server 21 using HTTP, then interprets HTML code, formats, and displays the interpreted result on a workstation display.

Additional servers 23 and 26 provide for access to web pages on the Internet. Web commerce server 23 and database 24 communicate on a LAN 25. LAN 25 may be, for example, an Ethernet-type network, also known as 10 BASE 2, 10 BASE 5, 10 BSAF, 10 BASE T, BASE BAN network, a COAX cable network, or the like. Merchant server 26 provides access to specific merchant web pages that include, but are not limited to, advertisements including specific merchandise information, ordering data, inventory data, shipping data, and customer support access.

Illustrated in FIG. 2 is the architecture of the shopper system 10, including the consumer system 12, commerce server 23, and merchant server 26.

The commerce server 23 provides a central site for merchant advertisement and item purchase information available to the users. The commerce server 23 administrates the merchant advertisement and purchase item registration, the keywords to search for the merchant advertisements or items, and categories for the merchant advertisement or purchase items. The commerce server 23 acts as an interface between the merchant server 26 and the client shopper 12. The commerce server also keeps the latest advertisement information for access by the shopper user 12. The commerce server supports searching merchant advertisements and purchase items based on keywords, store names, and coupons. The commerce server 23 also allows the merchant to track user advertisement access and the statistics with regard to utilization of the merchant advertisements.

The merchant server 26 includes the merchant shopper system 70 of the present invention. The merchant server 26 enables users to construct purchase/transaction logs of purchases acquired from each merchant 26. The merchant server 26 also publishes merchant specific advertisements to commerce server 23 via a network such as, but not limited to, the worldwide web. The merchant server 26 allows the merchant to publish, track and redeem coupons. The merchant server 26 also provides for a user interface for user shopper 12 interface with merchant customer support. The merchant 26 also enables catalog and shopping cart functionality by providing information with regard to items selected by either advertisement or search for placement into a purchased list or shopping cart. The merchant 26 also provides for a secure user shopper payment method.

The consumer shopper system 70 provides a mechanism to the user to register and list merchant advertisement and sales items by category and keyword. The consumer shopper system 70 also provides the user the ability to search merchant advertisements and purchase items by keyword, category and store name. The consumer shopper system 70 provides the ability to identify and display advertisements and items from featured merchants. The consumer shopper system 70 provides the mechanism to allow the user to decide what merchant advertisements to access and further allows the user to subscribe to specific advertisements or advertisements with a particular category of interest to be received. The consumer shopper system 70 accomplishes a subscription by filtering merchant advertisements and messages by category and keyword. The consumer shopper system 70 further tracks user statistics on advertisement effectiveness to the merchant. The consumer shopper system 70 also provides the consumer a local shopping cart to provide for comparison shopping and the ability to perform electronic purchasing. The consumer shopper system 70 is integrated with the MS wallet or Verifone for management of credit card payments. The consumer shopper system 70 also provides the consumer with the ability to create shopping lists and to export those shopping lists and receive updates. The consumer shopper system 70 also provides the ability to attach notes to items in both the shopper catalog list and shopping cart. The consumer shopper system 70 automatically creates a purchase log containing information specific with a user purchase and the ability to attach notes to items in the purchase log. In utilizing the purchase logs, the consumer shopper system 70 provides purchasing and tracking reports to the consumer. The consumer shopper system 70 also provides the ability to a user to subscribe and flag favorites and subscribe to stores of interest. The consumer shopper system 70 enables a consumer to communicate with stores' customer service departments via a chat function. The foregoing functionality resides in the commerce server 23, merchant server 26, and user computer system 12, which are herein defined with further detail in FIGS. 3 through 25 and are described hereafter.

Figure 3A:
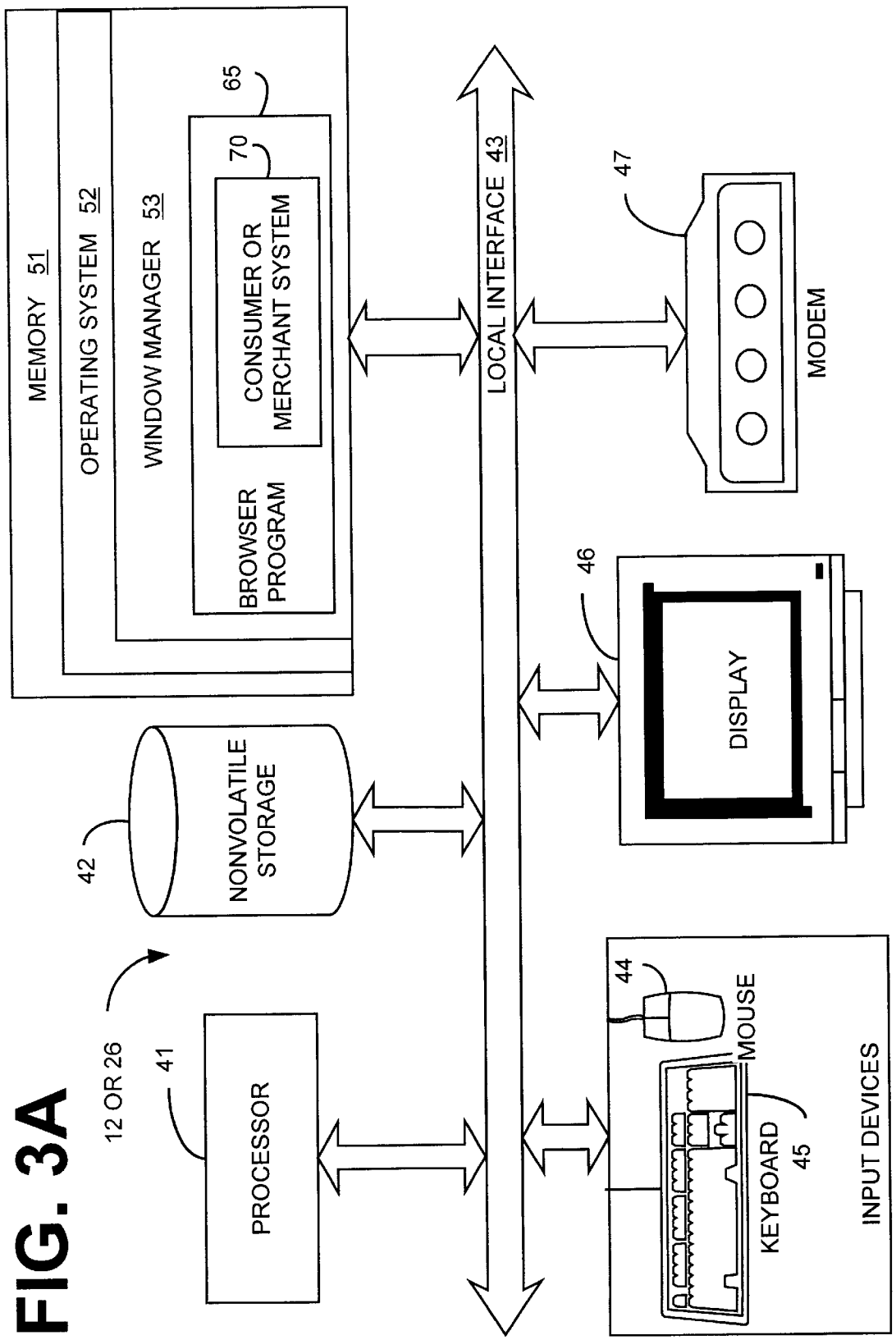
FIG. 3A is a block diagram illustrating a browser program situated within a computer readable medium, e.g., in memory of a computer system of the consumer systems.

FIG. 3A shows an example of a computer system 12 and 26 architecture, wherein the consumer or merchant shopper system 70 of the present invention may be implemented. As illustrated in FIG. 3, the computer system 12, 26 generally includes a browser program 65 (e.g., Netscape Navigator, Internet Explorer, or other browser program) for use in accessing locations on a network. These browser programs 65 reside in computer memory 51 (e.g., random access memory (RAM)) and/or nonvolatile storage device 42 (e.g., hard disk drive) and access communication facilities modem network card 47 to transport the user access to other resources connected to the network. In order to find a resource, the user should know the network location of the resource denoted by a network location identifier or URL. These identifiers are often cryptic, following very complex schemes and formats in their naming conventions.

The computer systems 12 and 26 identify, access, and process these resources desired by a user by using the processor 41, nonvolatile storage device 42, and memory 51 with an operating system 52 and window manager 53. The processor 41 accepts data from memory 51 and storage 42 over the local interface 43. Direction from the user can be signaled by using input devices, for example, a mouse 44 and a keyboard 45. The actions input and result output are displayed on a display terminal 46.

The first embodiment of the present invention involves the consumer shopper program 70. The consumer shopper program 70 is the software that interacts with the commerce and merchant servers to obtain the requested advertisement data and functionality requested by the consumer. The consumer shopper program 70 will be described hereafter in detail with regard to FIGS. 5 and 6.

Illustrated in FIG. 3B is the distributed process architecture of the shopper system 12 including the consumer system 12 commerce server 23 and merchant server 26. As noted with regard to FIG. 2 above, the commerce server 23 is the central site for the shopper system 12. The commerce server 23 includes the distributed portion of the commerce shopper system 70. The commerce server 23 shopper system 70 includes the distributed processor 100, herein defined with regard to FIG. 4; process 110, herein defined with regard to FIG. 5; process 130, herein defined with regard to FIG. 6; process 140, herein defined with regard to FIG. 7; process 150, herein defined with regard to FIG. 8; process 170, herein defined with regard to FIG. 9; process 180, herein defined with regard to FIG. 10; process 190, herein defined with regard to FIG. 11; process 200, herein defined with regard to FIG. 12; process 210, herein defined with regard to FIG. 13; process 230, herein defined with regard to FIG. 14; process 270, herein defined with regard to FIG. 16; and process 290, herein defined with regard to FIG. 17. The commerce server 23 distributed portion of the shopper system 70 includes a system and method to interact with the consumer system 12 distributed portion of the shopper system 70 and the merchant server 26 distributed portion of the shopper system 70.

Figure 10:
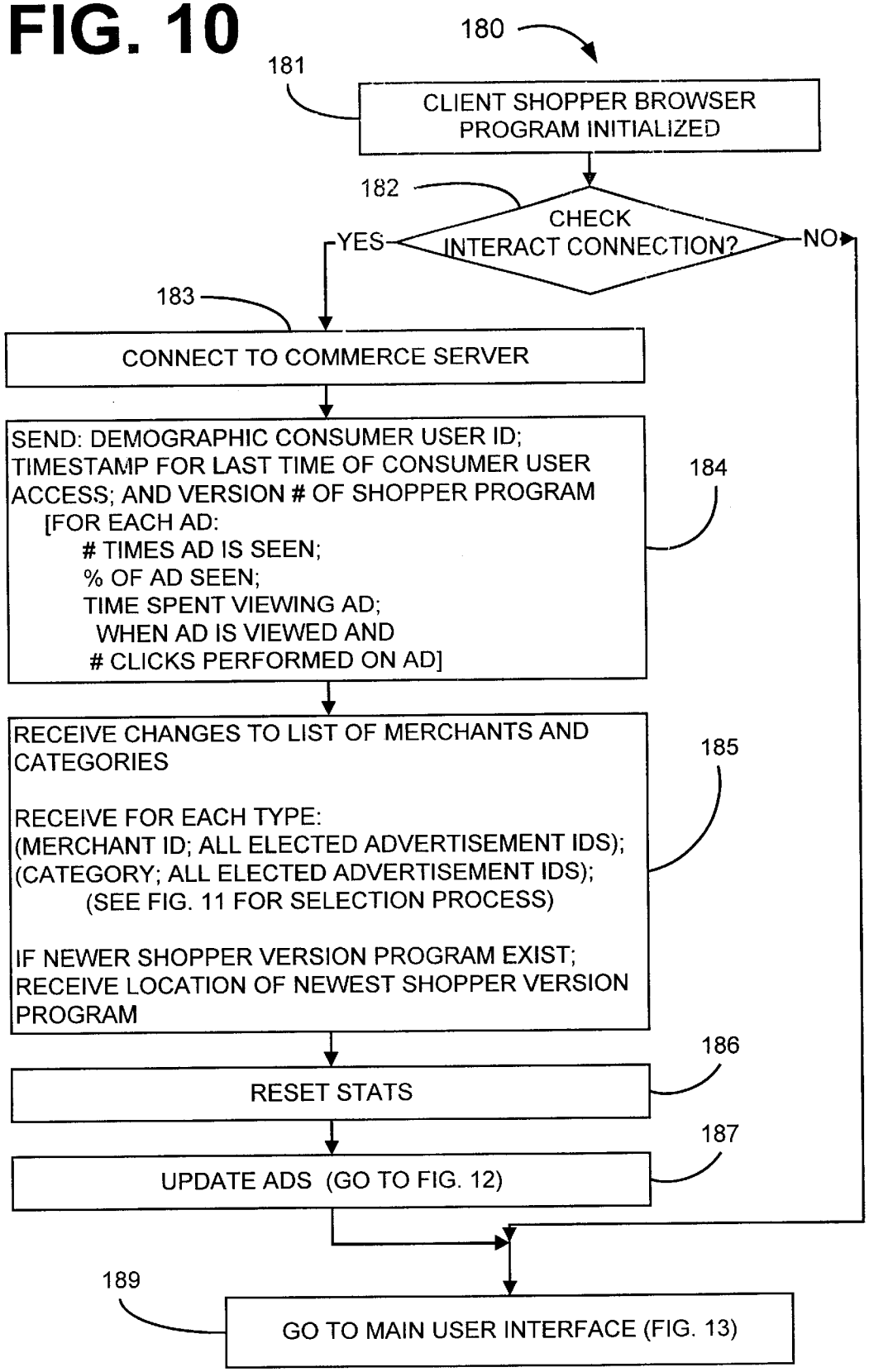
FIG. 10 is a flow diagram of the consumer application process for the consumer user browser process of the present invention, as shown in FIGS. 1, 2 and 3.
Figure 11:
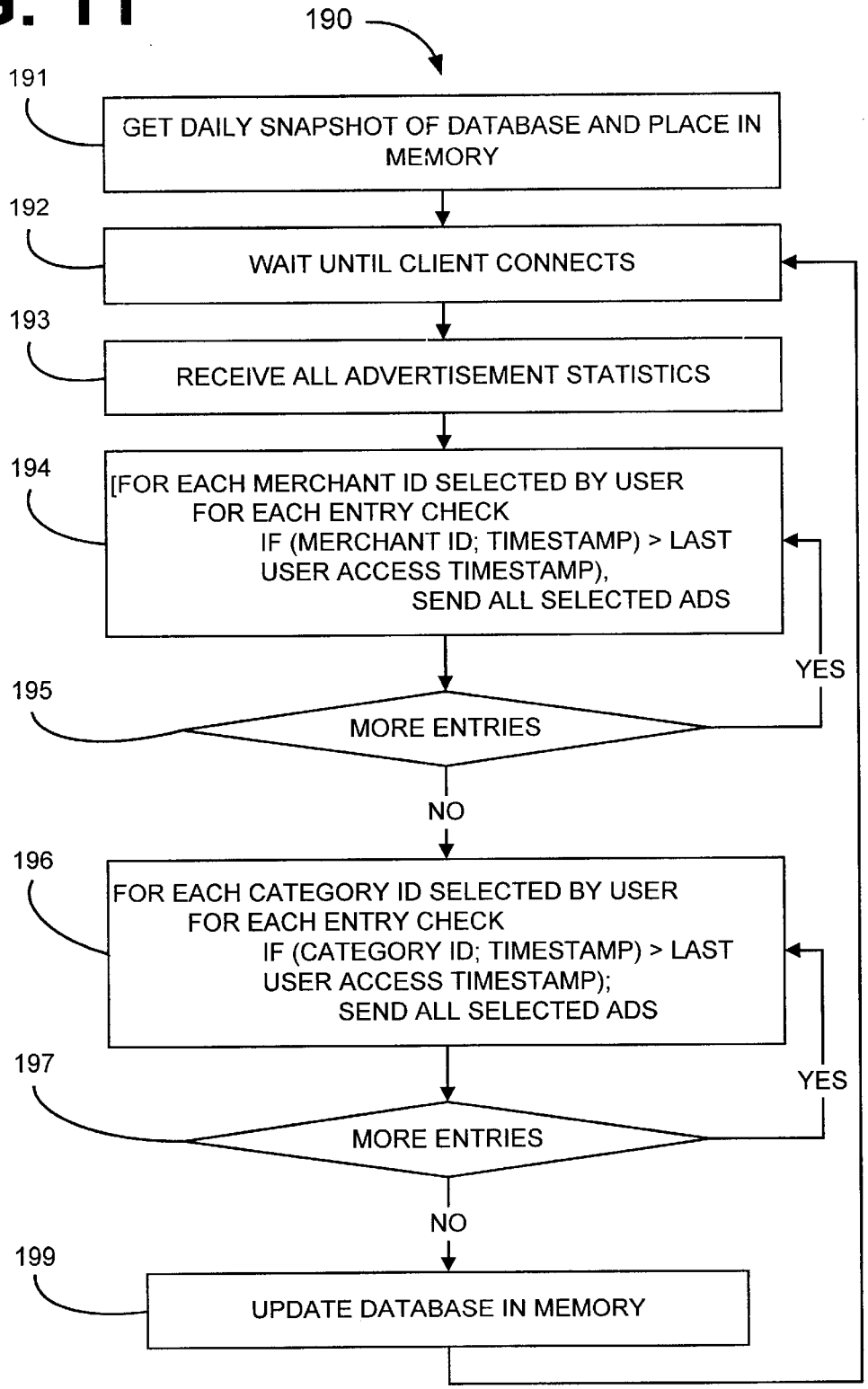
FIG. 11 is a flow diagram of the statistical information capture process for the commerce server of the present invention, as referenced in FIG. 10.
Figure 12:
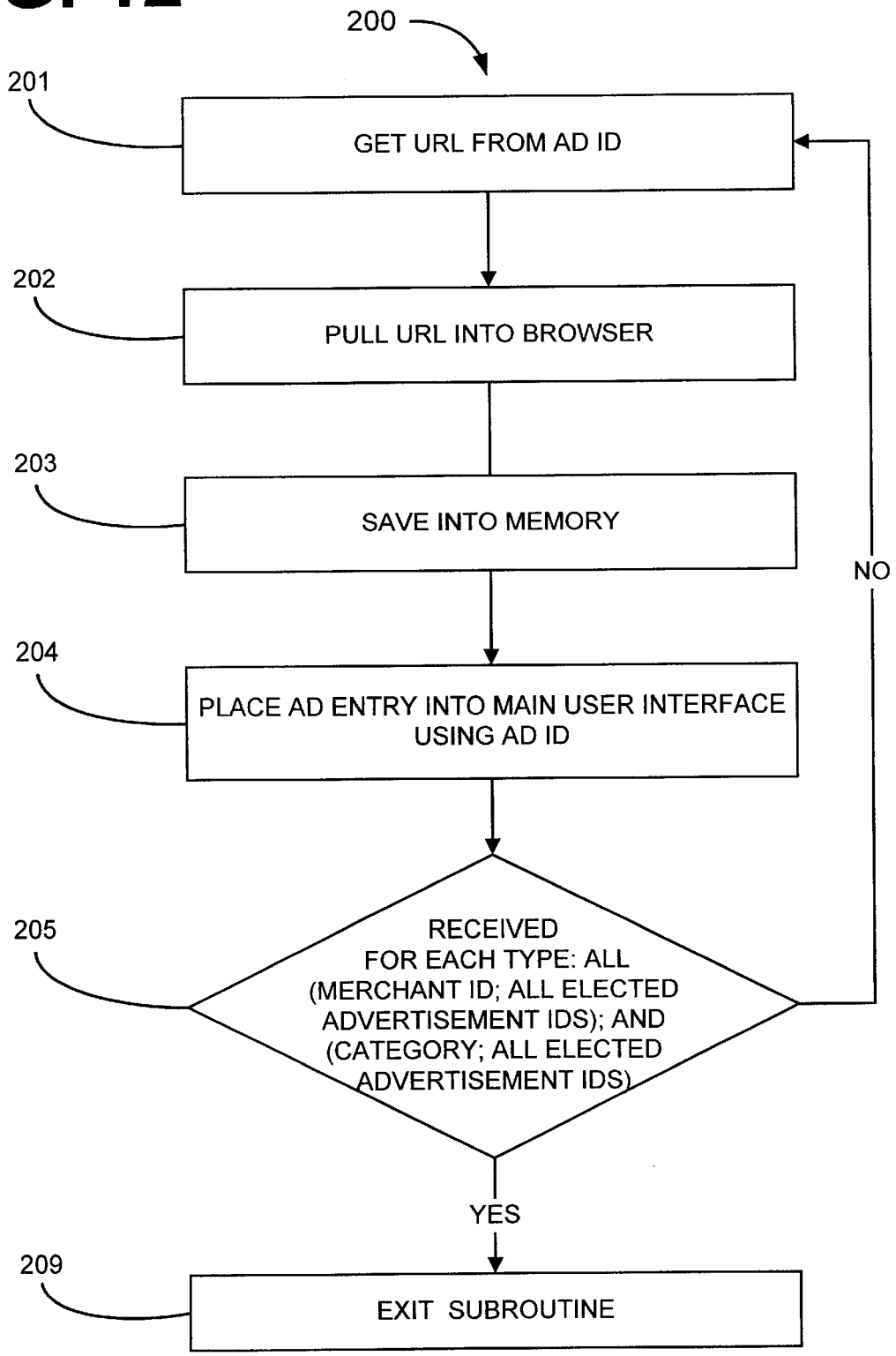
FIG. 12 is a flow diagram of the advertisement download process for the consumer user browser program process of the present invention, as shown in FIGS. 2 and 3.
Figure 13:
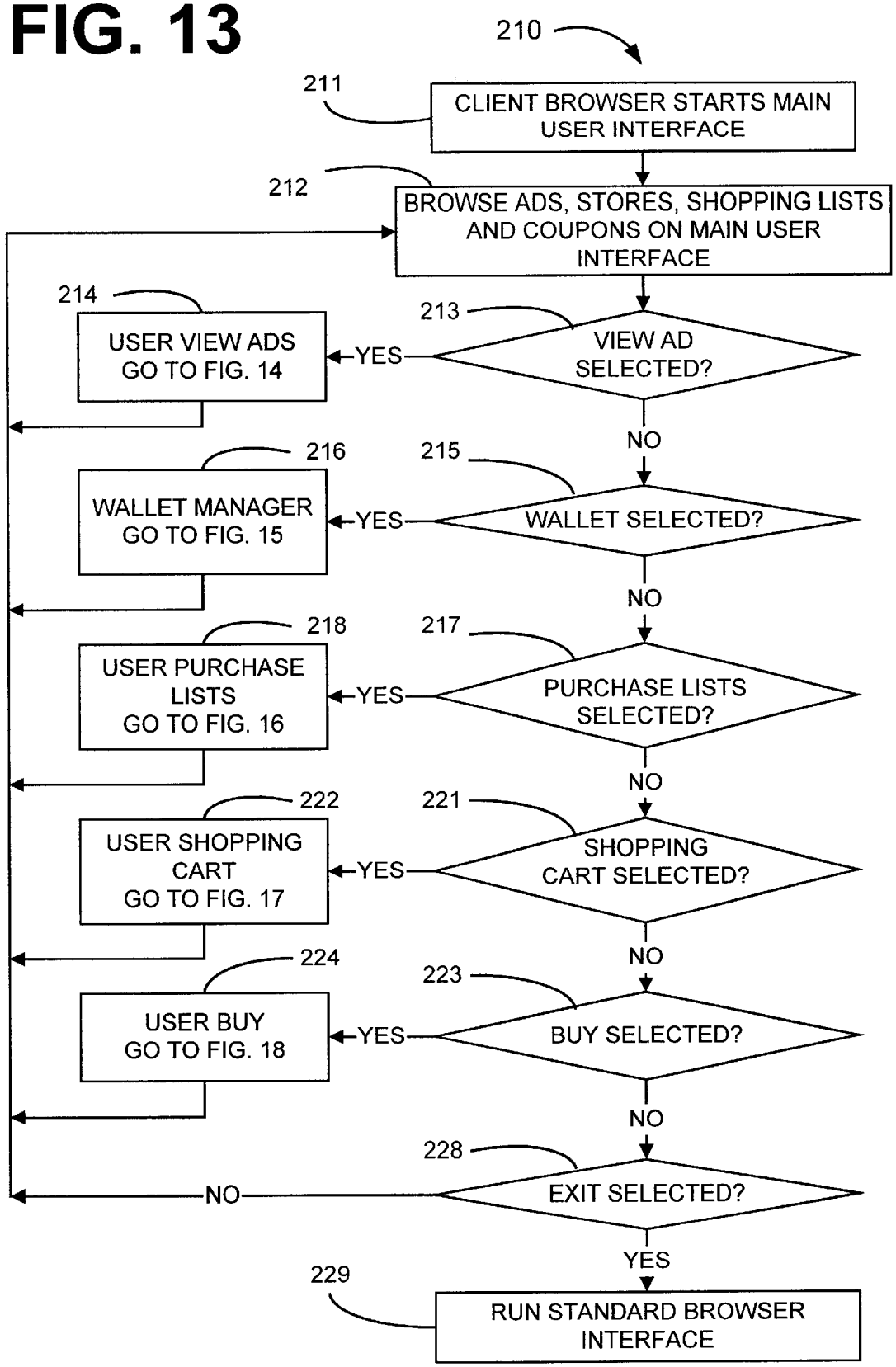
FIG. 13 is a flow diagram of the main user interface process for the consumer user browser program process of the present invention, as shown in FIGS. 2 and 3.
Figure 14:
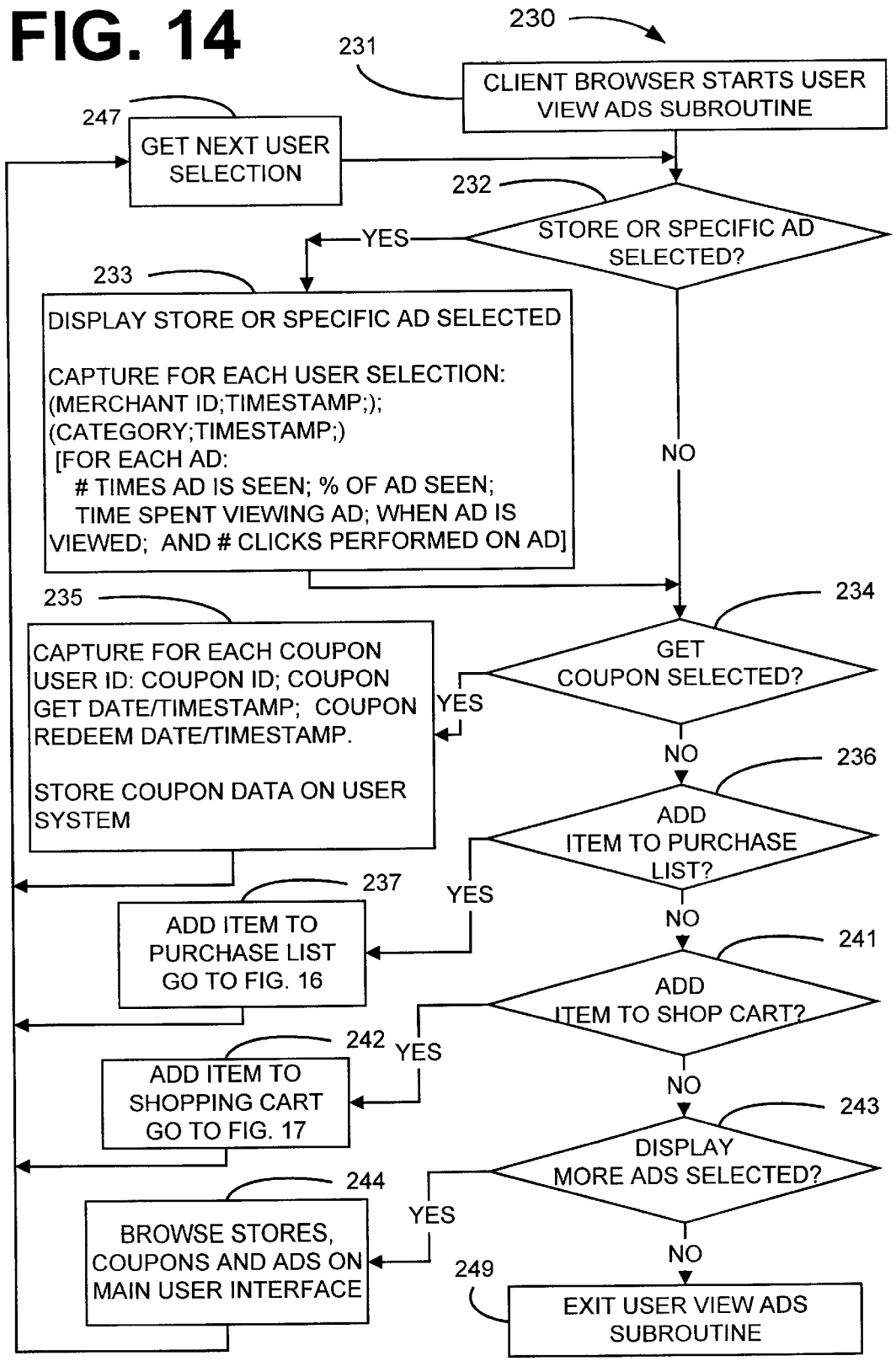
FIG. 14 is a flow diagram of the advertisement viewing process for the consumer user browser program process of the present invention, as shown in FIG. 13.
Figure 15:
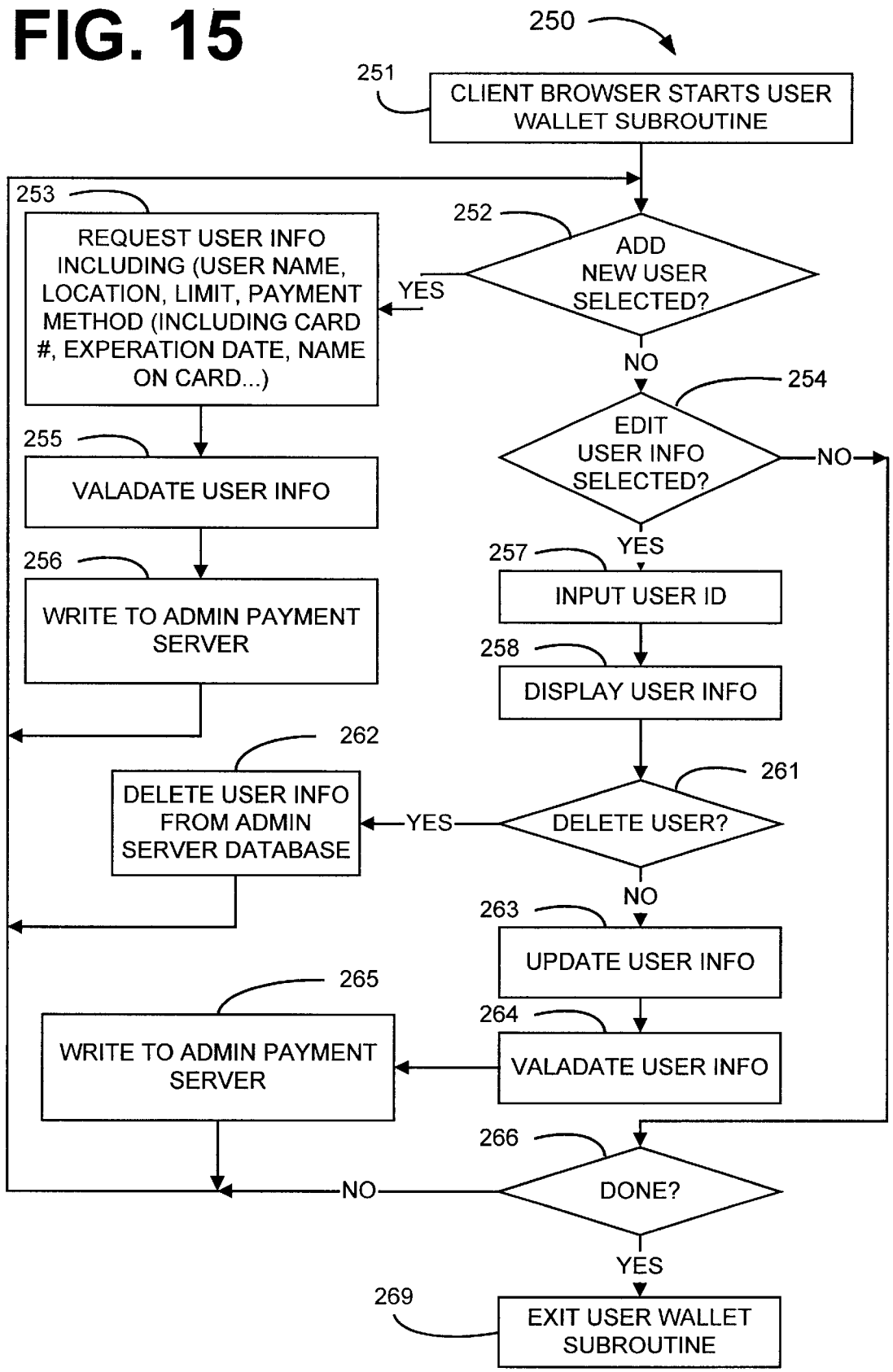
FIG. 15 is a flow diagram of the user wallet process with consumer user browser program process of the present invention, as shown in FIG. 13.
Figure 16:
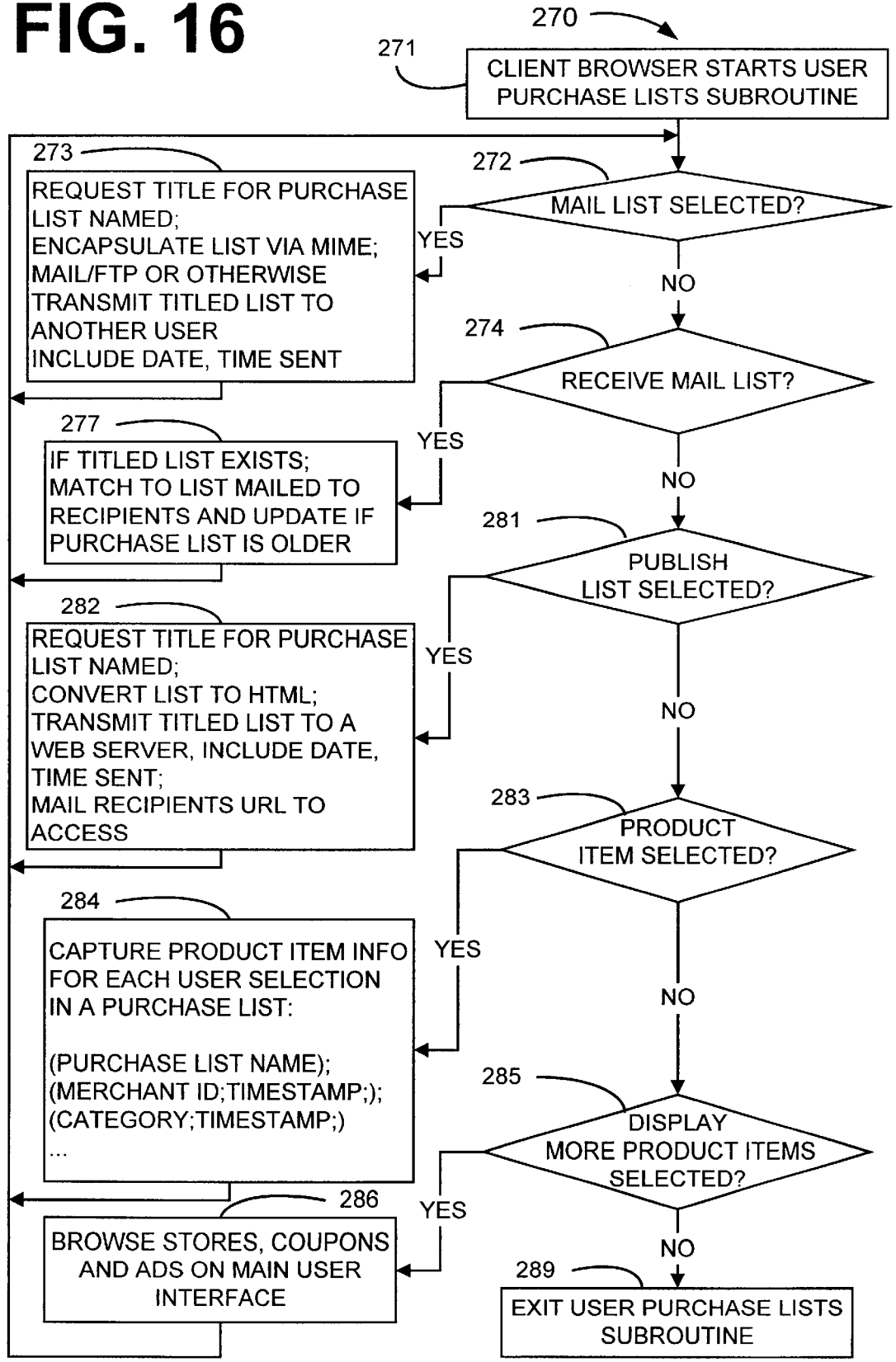
FIG. 16 is a flow diagram of the user purchase list process for the consumer user browser program process of the present invention, as shown in FIG. 13.
Figure 17:
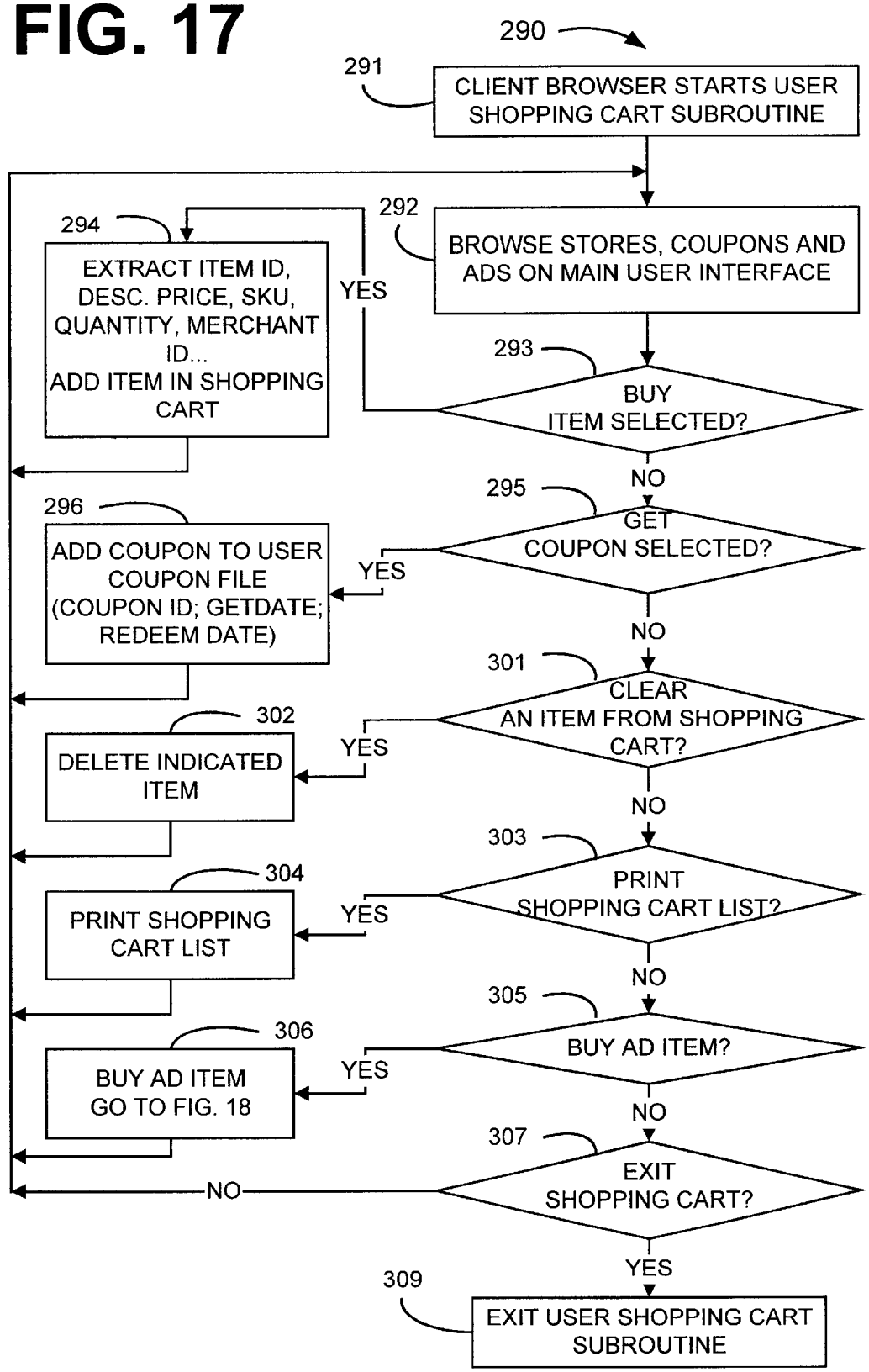
FIG. 17 is a flow diagram of the shopping cart process for the consumer user browser program process of the present invention, as shown in FIG. 13.
Figure 18:
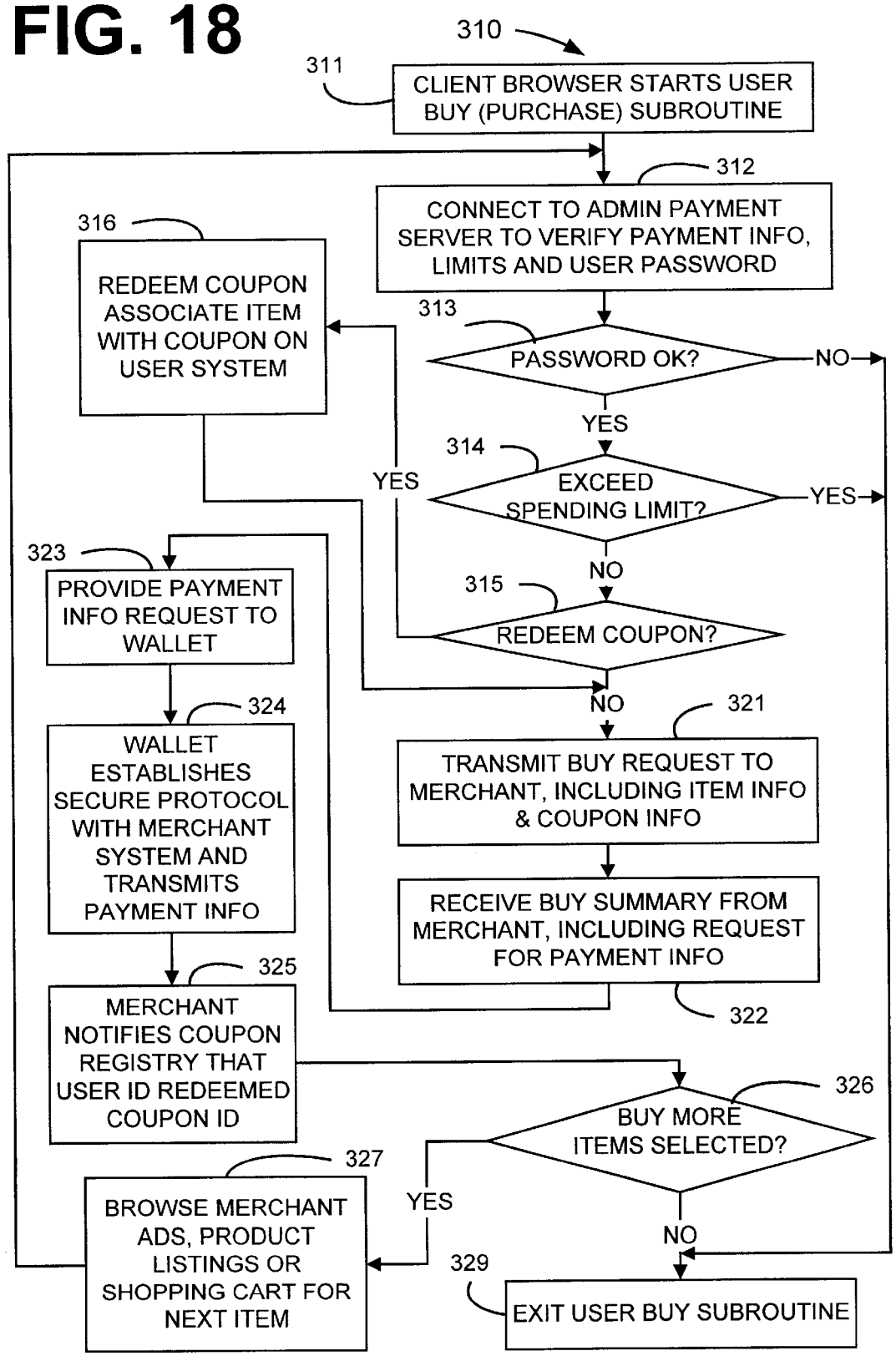
FIG. 18 is a flow diagram of the user electronic purchase process for the consumer user program process of the present invention, as shown in FIG. 13.

The consumer system 12 distributed portion of the shopper system 70 includes process 180, herein defined in further detail with regard to FIG. 10; process 190, herein defined in further detail with regard to FIG. 11; process 200, herein defined with regard to FIG. 12; process 210, herein defined in further detail with regard to FIG. 13; process 230, herein defined in further detail with regard to FIG. 14; process 250, herein defined in further detail with regard to FIG. 15; process 270, herein defined in further detail with regard to FIG. 16; process 290, herein defined in further detail with regard to FIG. 17; and process 310, herein defined in further detail with regard to FIG. 18.

The merchant server 26 distributed portion of the shopper system 70 includes the merchant sign-up and slot purchase process 100. The merchant server 26 distributed shopper system 70 also includes the commerce server 23 and merchant server 26 ongoing operation process 110, which is herein defined in further detail with regard to FIG. 5. The merchant server 26 distributed shopper system 70 further includes the report generation process 130, herein defined in detail with regard to FIG. 6. The merchant server 26 shopper system 70 also includes the advertisement publishing process 130, herein defined in further detail with regard to FIG. 6. Also included is the editing manager process 150 which is herein defined in further detail with regard to FIG. 8. The merchant server 26 distributed shopper system 70 also includes the user electronic purchase process 310 herein defined in further detail with regard to FIG. 18.

With the shopper system 10 being comprised of the distributed shopper system 70, it is contemplated by the inventors that the process mechanisms herein defined above can be utilized on any of the processing systems in the network. For example, the shopper system 10 distributed shopper system 70 can utilize the processing power of the commerce server 23 to provide processing of all consumer system 12 shopper system 70 functionality and allow the consumer system 12 to be a dumb or network terminal. It is also contemplated by the inventors that the merchant server 26 could also be a dumb or network terminal and provide for all the merchant server 26, shopper system 70 functionality process mechanisms to be implemented on the commerce server 23.

Figure 4:
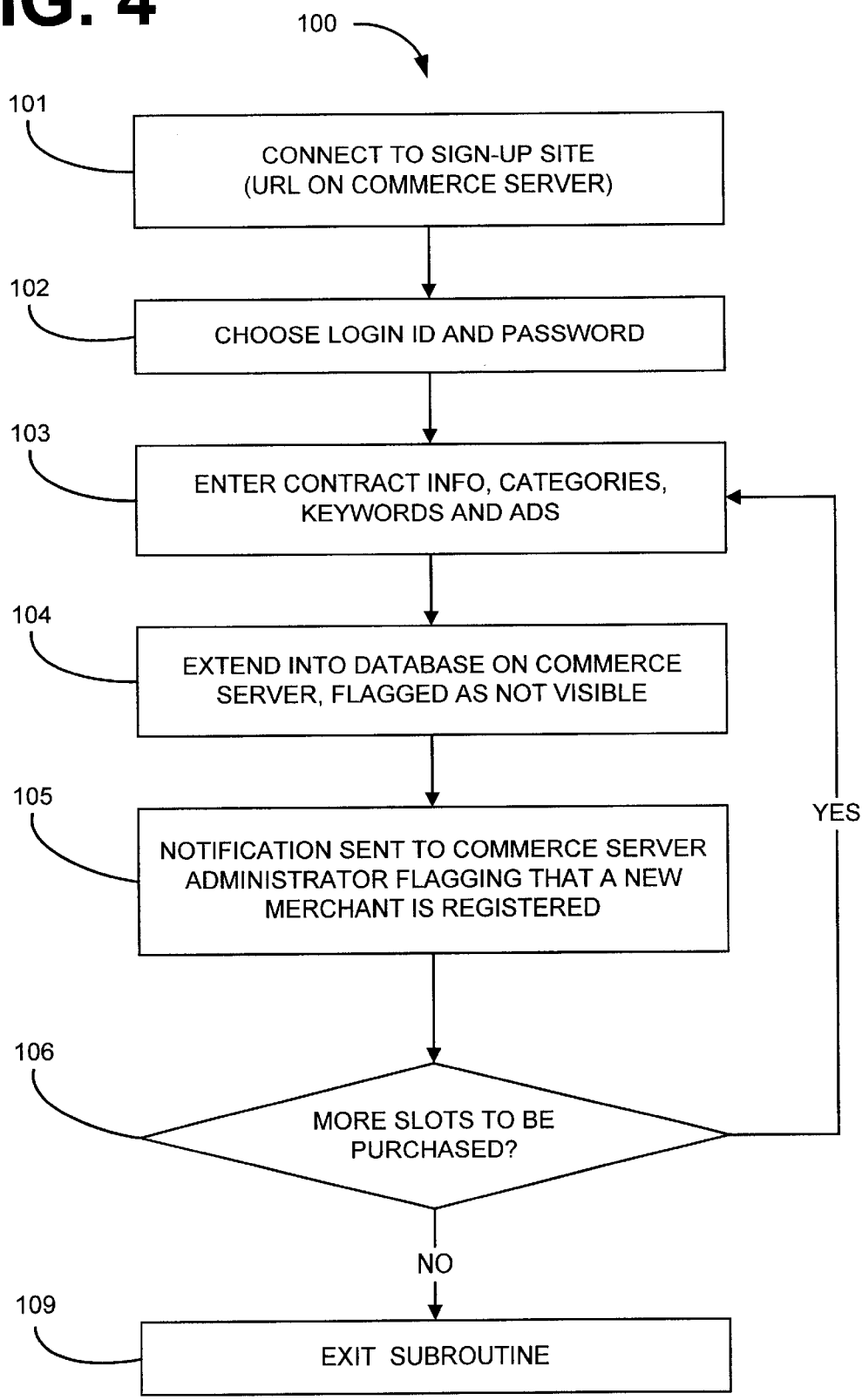
FIG. 4 is a flow diagram of the merchant sign-up and slot purchase process for the merchant server application of the present invention, as shown in FIGS. 1 and 2.

Illustrated in FIG. 4 is the flow diagram of the merchant sign-up and slot purchase process for the merchant application 100 of the present invention. The flow diagram of FIG. 4, as well as the flow diagrams of subsequent figures illustrate the architecture, functionality, and operation of the respective software that they are intended to represent. A merchant connects to the commerce server 23 to sign up at step 101. The merchant accomplishes this by utilizing the URL on the commerce server 23. The merchant then chooses a logon identification (ID) password and inputs this data into the commerce server 23. This logon ID password information is written to a file within database 24.

The merchant next enters the required contractual information, categories for the desired advertisement to be included in, and keywords for identifying the merchant advertisement in the advertisement itself at step 103. The commerce server 23 writes the contract information, categories for the included advertisement, keywords to search the included advertisement, and the merchant advertisement itself into database 24 at step 104. Next, the commerce server 23 generates and sends a notification to the commerce server administrator, indicating that a new merchant has been registered at step 105.

Then, the merchant is queried if the merchant wishes to purchase more advertisement slots at step 106. If the merchant wishes to purchase additional advertising slots, the process returns to step 103 to repeat the above steps 103 through 105. If the merchant declines to purchase additional slots at this time, the process then exits at step 109.

Illustrated in FIG. 4 is the flow diagram of the ongoing operation process for the commerce server 23 application with the merchant server website 26 of the present invention. The merchant logs into the commerce server 23 with the ID and password established in FIG. 4, step 102, at step 111. The commerce server 23 waits for the merchant user to input a request for data at step 112.

The data input is then tested to see if the merchant requests an advertisement to be published at step 113. If an advertisement is to be published, then the process goes to step 114 to execute the published advertisement routine herein further defined with regard to FIG. 6. After the commerce server 23 has published the advertisement at step 114, the commerce server 23 then proceeds to step 121. If the merchant has not selected to publish an advertisement, the commerce server 23 then checks if the merchant has selected a report at step 115.

Figure 7:
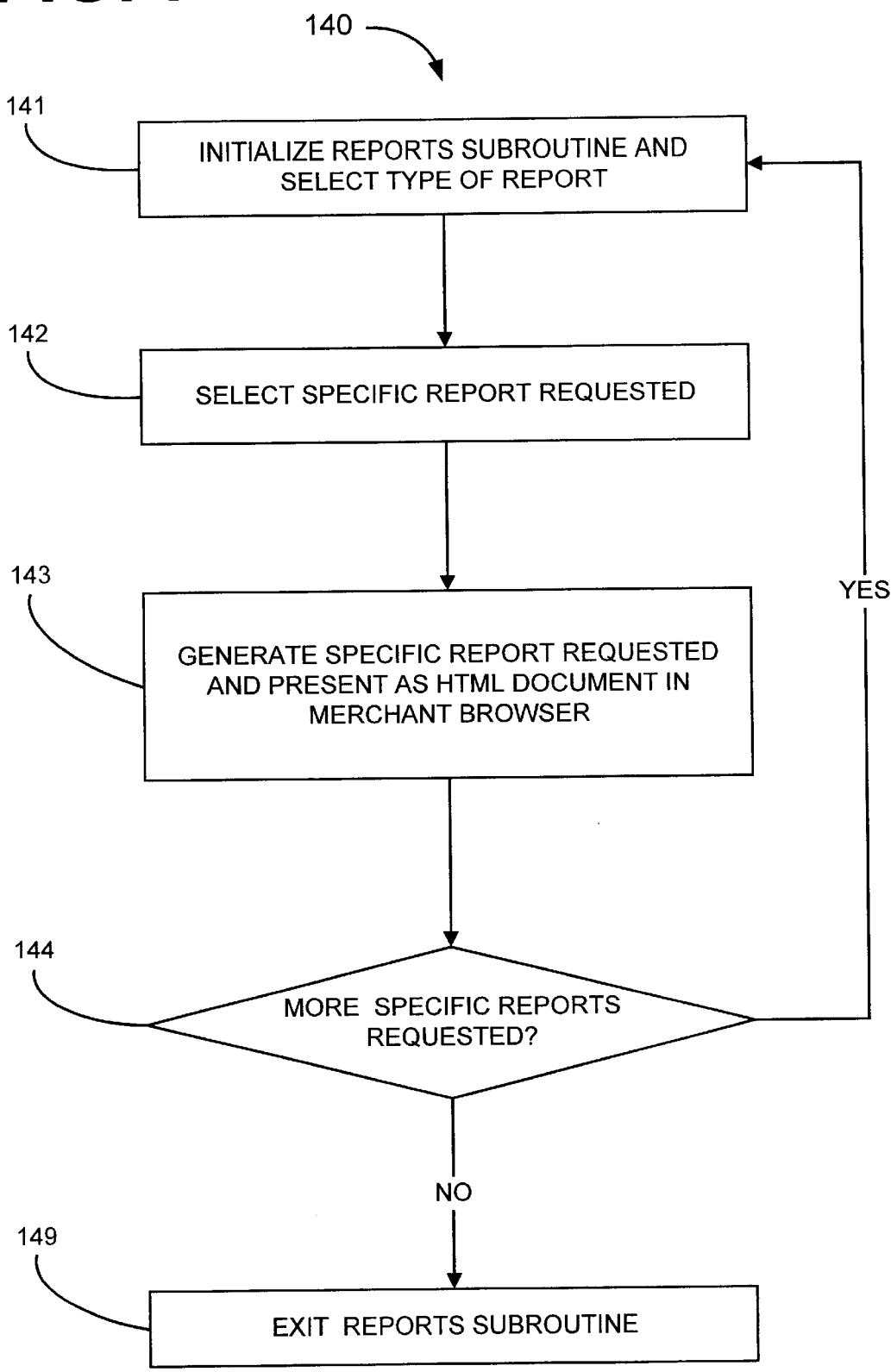
FIG. 7 is a flow diagram of the report generation process for the consumer server of the present invention, as shown in FIG. 5.

If a report has been selected at step 115, the commerce server 23 then proceeds to step 116 to obtain the desired report which is herein defined in further detail with regard to FIG. 7. After retrieving the desired report at step 116, the commerce server then proceeds to step 121. If a report is not requested at step 115, the commerce server 23 then checks if the merchant has indicated that a profile edit is to be performed at step 117.

Figure 8:
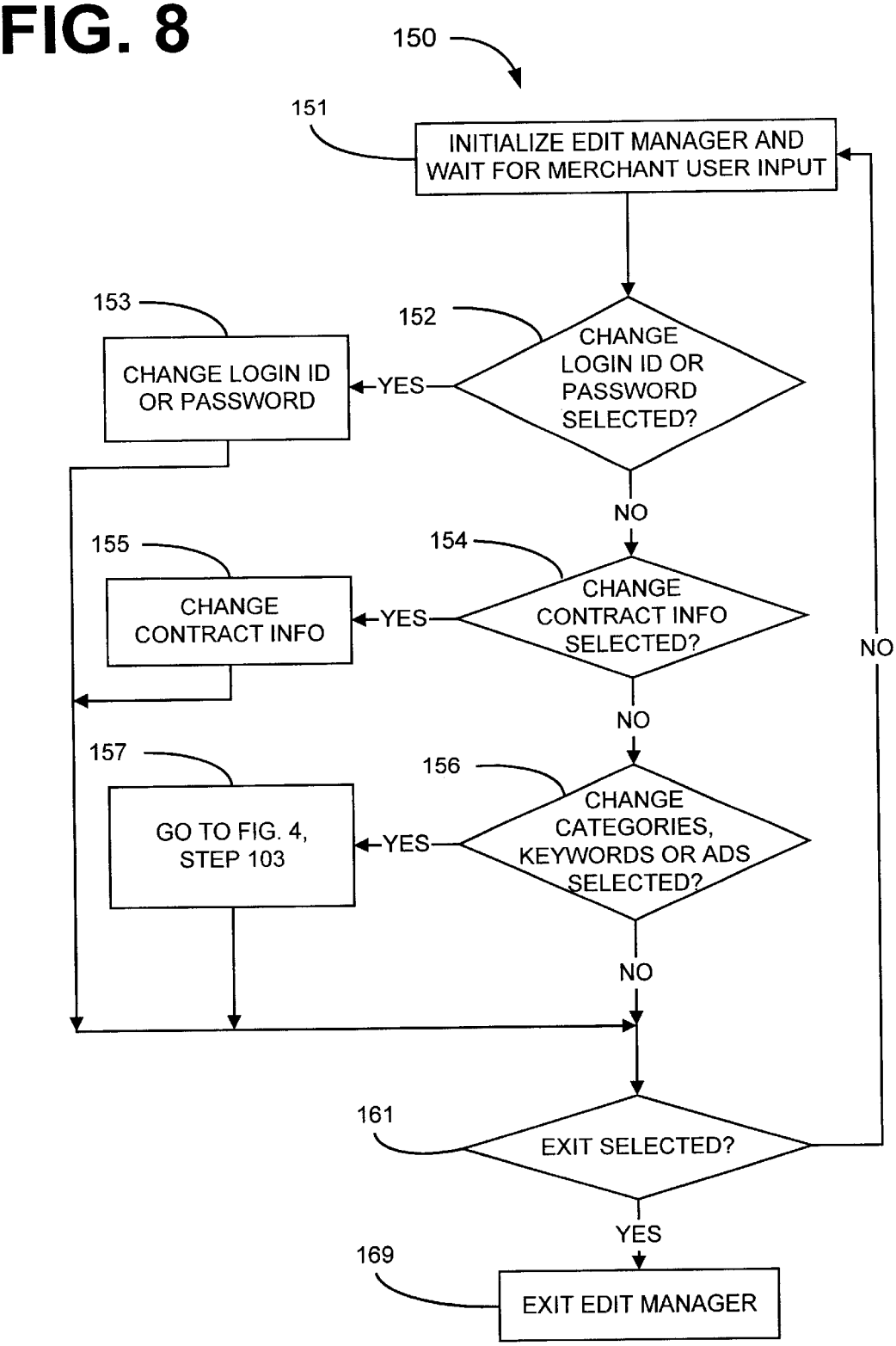
FIG. 8 is a flow diagram of the edit profile process for the commerce server of the present invention, as shown in FIG. 5.

When a profile edit is to be performed, the commerce server 23 then proceeds to step 118 to process the edit profile procedure desired by the merchant which is herein further defined with regard to FIG. 8. After performing the desired profile edit at step 118, the commerce server then proceeds to step 121. If at step 117 the merchant has not selected to edit the profile, the commerce server then checks if exit of the normal operating procedure is requested at step 121.

If the exit is not selected at step 121, the commerce server then returns to step 112 for further processing. When an exit has been selected at step 121, the commerce server 23 then exits the merchant manager program at step 129.

Figure 6:
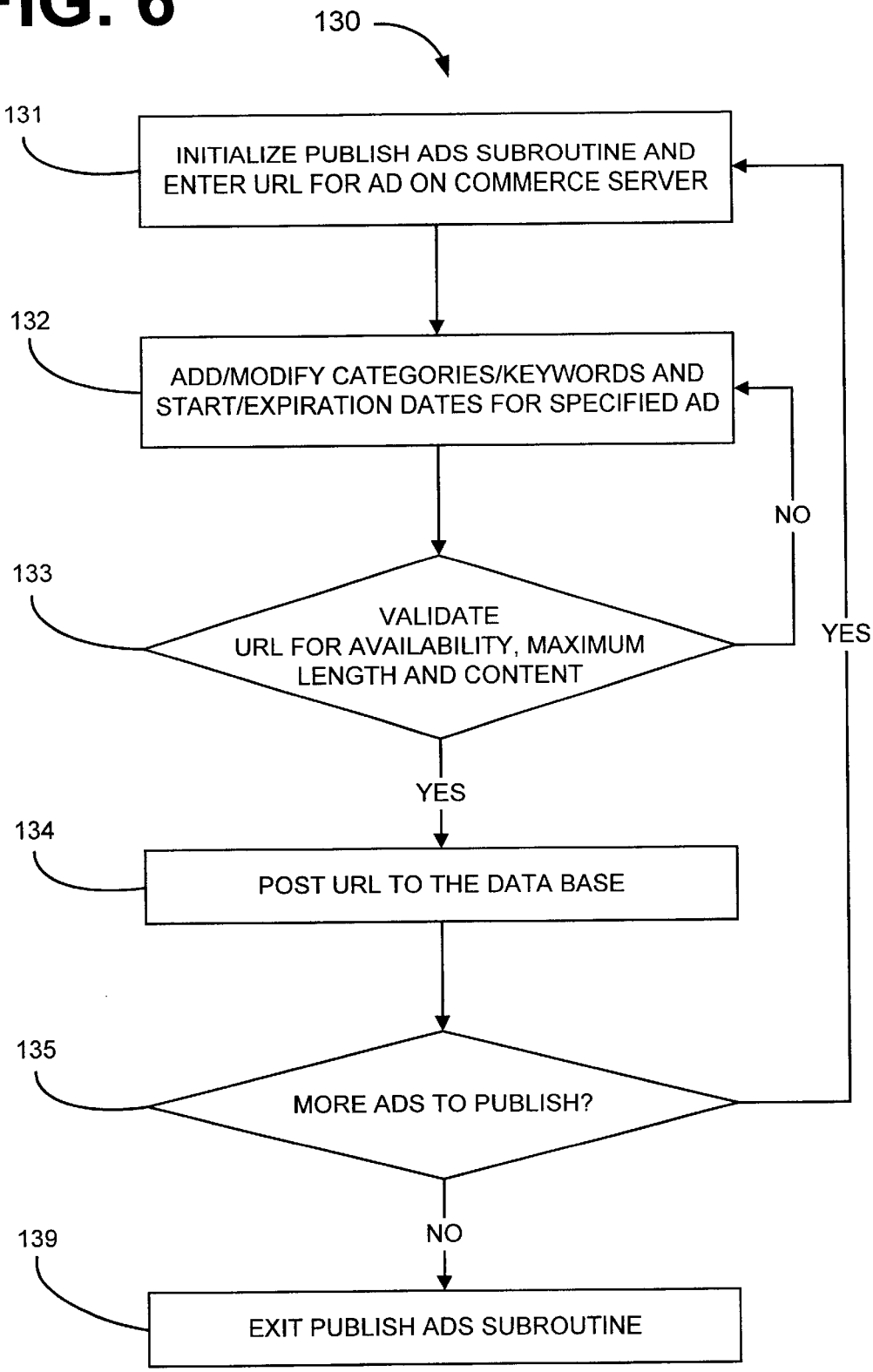
FIG. 6 is a flow diagram of the advertisement publishing process for the consumer server of the present invention, as shown in FIG. 5.

Illustrated in FIG. 6 is the flow diagram of the advertisement publishing process for the commerce server 26 application of the present invention. The advertisement publication routine requests the URL for a particular advertisement on the commerce server 23 from the merchant at step 131. The commerce server 23 then checks the categories and/or keywords and the start and expiration dates for the specified advertisement to be published at step 132.

The commerce server 23 then validates the URL for availability, maximum length and acceptable content at step 133. If the validation fails for availability, maximum length, acceptable content or other tests of the like, the commerce server 23 returns to step 132 to further modify the advertisement. If the commerce server 23 validates the advertisement at step 133, then the commerce server 23 posts the advertisement URL to the database 24 at step 134. The commerce server 23 tests if the merchant desires to publish more advertisements at step 135. If the merchant wishes to publish more advertisements, the process returns to step 131 for continued processing. If the merchant has chosen not to publish more advertisements at step 135, the commerce server exits the publication routine at step 139.

Illustrated in FIG. 7 is the flow diagram of the report generation process for the consumer server application of the present invention. The commerce server 23 first allows the merchant to select a type of report for generation at step 141. The commerce server 23 then requests the merchant to select a specific type of report requested at step 142. The commerce server 23 next generates a specific report requested and presents the report as a HTML document to the merchant website 26 merchant browser at step 143. In an alternative embodiment, these documents can be generated in other types of desired formats.

The reports can include but are not limited to the following information: Total number of impressions; Average number of impressions per client; Average time spent viewing an advertisement (i.e. impression duration); Graph of number of times advertisement seen vs. time of day; Average percentage of advertisement seen (e.g. on average, clients saw 92% of the ad); Total number of click-throughs (user clicks on advertisement URLs); Number of customers where the merchant is a favorite; Share of favorites slot—number of customers listing merchant as a favorite vs. total customers that have favorites (including breaking this down by category as well, e.g. of customers who list shoe stores in their favorites, a specific merchant is listed 71.3% of the time); advertisement share—Of all advertisements a customer has viewed, how many have been from this merchant; Time share—Of all advertisements, favorites, banners, etc., how much time have customers spent on average "viewing" the merchant; What share of advertisement clicks does the merchant get (number clicks to the merchant vs. clicks to other merchants); Distribution of the host domains used to access the merchant via the consumer registry (e.g. 75% from the .com domain, 10% from the .edu domain, etc.); Average connection speed of consumers connecting to the merchant registry and which visit the merchant; Breakdown of customer's screen resolution & screen depth; Distribution of client default browser settings.

The commerce server 23 then checks if the merchant has requested more specific reports at step 144 and if more reports are requested returns to step 141 for further processing. If no more specific reports are requested at step 144, then the report publication subroutine is exited at step 149 and returns to step 121 in FIG. 5.

Figure 5:
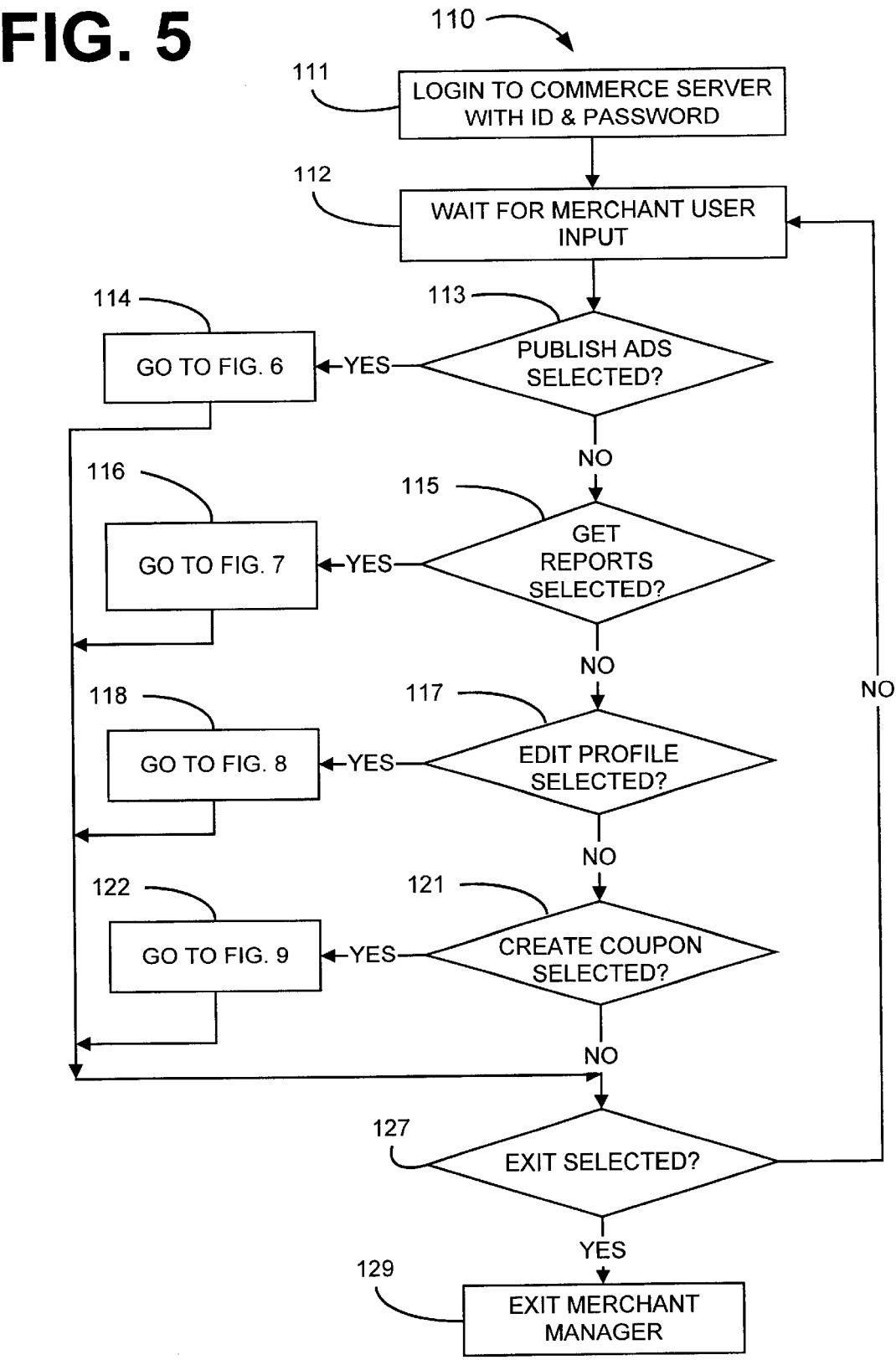
FIG. 5 is a flow diagram of the ongoing operation process for the commerce server with the merchant server website of the present invention, as shown in FIGS. 1 and 2.

Illustrated in FIG. 8 is flow diagram of the edit profile process for the commerce server 23 application of the present invention, referenced in FIG. 5 at step 118. The commerce server 23 waits for the merchant to input edit profile information at step 151. The commerce server 23 checks to see if the merchant requests a change of the login ID or password at step 152. If a change to the login ID or password is selected at step 152, the commerce server 23 then changes the login ID or password at step 153 and proceeds to step 161. If a change to login ID or password is not selected at step 152, the commerce server 23 checks if a change to contract information is selected at step 154.

If a change to the contract information is selected, the commerce server 23 performs the requested contract information change at step 155 and proceeds to step 161. If a change to the contract information is not selected at step 154, the commerce server 23 then determines if the merchant requires a change to the category's keywords or an advertisement at step 156. If a change to the category's keywords or advertisement is selected at step 156, commerce server 23 then returns to perform the change to the advertisement requested at step 157. The change to the category's keyword or advertisement information is performed at FIG. 4, steps 103–109.

After completing a change to the category's keywords or advertisement information at step 157, the commerce server 23 then proceeds to step 161. If a change to the category's keywords or advertisement information is not selected at step 156 by the merchant, the commerce server 23 then checks if the merchant has indicated exit from the profile editing function at step 161. If exit of the profile edit routine is not requested at step 161, the commerce server 23 then returns to step 151 for further profile editing. If exit is selected at step 161, the commerce server 23 then exits via edit manager at step 169 and returns to step 121 in FIG. 5 for continued processing.

Figure 9:
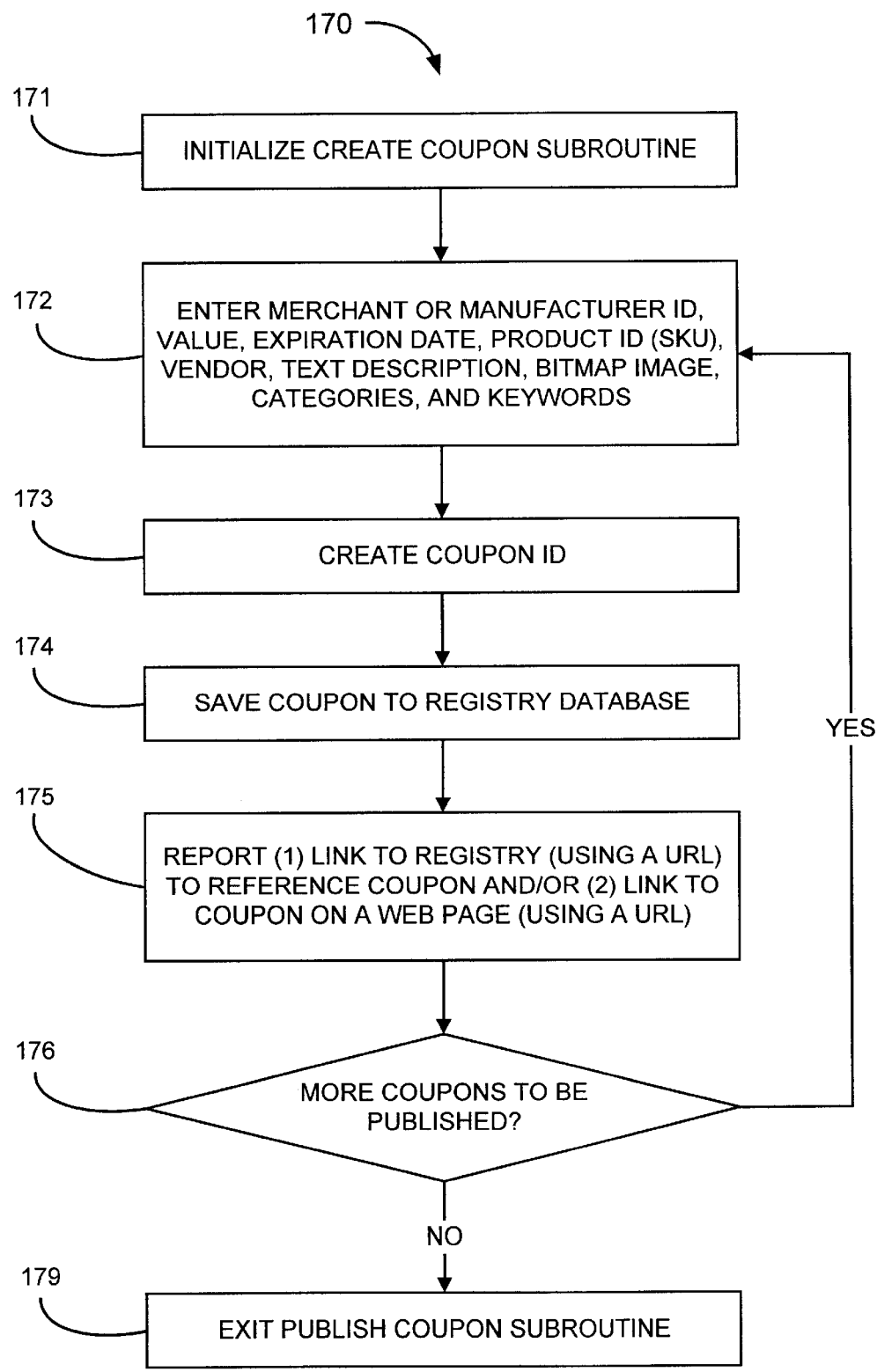
FIG. 9 is a flow diagram of the coupon creation process for the merchant server of the present invention as shown in FIG. 5.

Illustrated in FIG. 9 is a flow diagram of the coupon creation process for the commerce server 23 application of the present invention referenced in FIG. 5 at step 122. The coupon creation process 170 is initialized at step 171 and waits for the merchant to input coupon information. The commerce server 23 accepts the input of merchant or manufacturer identification, the coupon value, expiration date, product ID associated with the coupon at step 172. The coupon creation subroutine 170 also accepts input of vendor ID, text description of the product associated with the coupon, a bit map image of the product, the categories for the coupon, and keywords to assist in searching of the coupon, at step 172. The commerce server 23 then creates a unique coupon ID at step 173, to uniquely identify the coupon information input by the merchant at step 172. The commerce server 23 saves the merchant or manufacturer information accepted at step 172 and the unique coupon ID created at step 173, into the coupon registry database at step 174. The commerce server 23 next reports (1) the coupon link to the registry using a URL to reference the coupon, and (2) the link to the coupon on a web page using a URL to the general public at step 175. At step 176, the commerce server 123 checks to see if the merchant has requested more coupons to be published. If more coupons are to be published, then the commerce server 23 returns to repeat steps 172 through 176. If there are no more coupons to be published at step 176, the commerce server 23 exits the publish coupon subroutine at step 179.

Illustrated in FIG. 11 is the flow diagram of the consumer shopper program 70 for the consumer user browser 65 of the present invention. The consumer shopper program 70 is initialized by the user at step 171. The consumer or merchant shopper program 70 checks if the consumer requests a commerce server 23 interact connection at step 172. If the consumer has not requested interaction with commerce server 23 at step 172, the consumer shopper program 70 then proceeds to step 179 to continue processing with the main user interface in FIG. 13.

If the consumer does request interaction with the commerce server 23 at step 172, the consumer shopper program 70 then connects to the commerce server 23 at step 173. Once the connection is established with the commerce server 23, the consumer shopper program 70 then sends the demographic ID number for the consumer, the time stamp for the last time the consumer data was downloaded, and the version number of the program used by the consumer. The consumer shopper program 70 also sends for each merchant ID advertisement and each category advertisement, the statistical information for each advertisement the consumer has viewed. The statistical information captured about each advertisement viewed by the consumer includes, but is not limited to: the number of times each advertisement for each merchant in each category is seen; the percentage of the advertisement viewed; the total amount of time spent viewing the advertisement; what time periods of the day the advertisement is viewed; and the number of times the user has clicked on the advertisement to obtain further information from the merchant website 26. The consumer program will continue to send this type of information for each merchant ID and category ID, for each advertisement with captured statistical information.

Once the consumer shopper program 70 has sent all the statistical information captured from the consumer interaction, the consumer shopper program 70 requests and receives from the commerce server 23 all advertisements from each merchant and in each category that the user has preselected at step 175. This process on the commerce server 23 is herein defined in detail with regard to FIG. 9.

The consumer shopper program 70 also receives from the commerce server 23, any changes or updates to the list of merchants or categories. Also at step 175, the consumer shopper program 70 detects from the commerce server 23 if a newer consumer program version exists. If a new consumer shopper program 70 version exists, then the commerce server 23 transmits the location of the newest consumer shopper program 70 version at step 175.

Once the consumer shopper program 70 has received all the new advertisements regarding each merchant and each category selected at step 175, the consumer shopper program 70 then resets all the statistical information captured with regard to all elected advertisements at step 176. The consumer shopper program 70 then updates the advertisements on the main user interface at step 177. The update of the main user interface is herein defined in further detail with regard to FIG. 13.

After the consumer shopper program 70 has interacted with the commerce server 23 and sent all statistical information and received all new advertisements, the consumer shopper program 70 then goes to the main user interface for continued processing at step 179. The main user interface is herein defined in further detail with regard to FIG. 13.

Illustrated in FIG. 11 is the flow diagram of the statistical information capture process performed by the commerce server 23 of the present invention. Once the consumer shopper program 70 has established a connection with the commerce server 23 at step 173 in FIG. 9, the commerce server 23 receives the statistical information for each advertisement viewed by the consumer with regard to each merchant ID and category ID previously selected. As defined previously, the statistical information acquired by the consumer shopper program 70 includes, but is not limited to, the number of times each advertisement is viewed, the percentage of the advertisement viewed by the consumer, the total time spent viewing each advertisement, at what time of day each advertisement is viewed and the number of times the consumer has requested further information with regard to an advertisement by clicking on the advertisement.

The commerce server 23, upon connection with the consumer shopper program 70 at step 173 in FIG. 9, acquires a daily snapshot of the advertisement database 24 and places the advertisement database 24 in memory at step 181. The commerce server 23 then waits for a consumer shopper program 70 to establish a connection at step 182. This connection is defined for the consumer shopper program 70 at step 173.

The commerce server 23, upon establishing a connection with the consumer shopper program 70 receives all advertisement statistics at step 183. These statistics were previously defined with regard to step 174 in FIG. 9.

At step 184, the commerce server 23 checks all of the advertisements viewed by the consumer for each merchant ID preselected by the consumer. For each merchant ID preselected, the commerce server 23 determines if the current merchant ID advertisement time stamp is newer than the last merchant ID advertisement accessed by the consumer. If so, the commerce server 23 transmits, to the consumer, all new merchant advertisements that are newer than the one last accessed by the consumer. The commerce server 23 then checks if there are more merchant ID entries to be processed at step 185 and returns to step 184 if there are more entries to be processed.

If there are no more category ID entry advertisements, the commerce server 23 then checks all of the advertisements viewed by the consumer for each category ID preselected by the consumer at step 186. For each category ID preselected, the commerce server 23 determines if the current category ID advertisement time stamp is newer than the last category ID advertisement accessed by the consumer. If so, the commerce server 23 transmits, to the consumer, all new category advertisements that are newer than the one last accessed by the consumer. The commerce server 23 then checks if there are more category ID entries to be processed at step 187 and returns to step 186 if there are more entries to be processed.

If there are no more category ID advertisements at step 187, the commerce server 23 then updates the advertisement database in memory at step 189 and then loops to step 182 to wait for the next consumer to connect to the commerce server 23.

Illustrated with regard to FIG. 11 is the flow diagram of the advertisement download process 190 for the consumer shopper program 70 of the present invention, previously referenced herein at step 177 in FIG. 9. The update advertisement process residing in the consumer shopper program 70 acquires the URL from the advertisement ID at step 191. The consumer shopper program 70 pulls the URL, using a background thread or process, into the browser 65 at step 192. The consumer shopper program 70 saves the URL into memory at step 193. In applications where the consumer browser 65 is Internet Explorer, there is a temporary Internet file folder defined for these type of documents. However, it is well known in the art that there are numerous ways to provide memory storage accessed by a browser program.

The consumer shopper program 70 next places the advertisement entry into the main user interface utilizing the advertisement ID at step 194. The consumer shopper program 70 next checks if there are more advertisements to be received for all preselected merchant IDs and category IDs at step 195. If not all elected advertisement IDs have been received at step 195, the consumer program returns to step 191 to receive the next URL from the commerce server 23. If all advertisement IDs have been received for all the elected merchant IDs and category IDs selected by the consumer at step 195, then the update advertisement routine is terminated at step 199.

Illustrated in FIG. 12 is the flow diagram for the operation of the main user interface 210 referenced with regard to step 179 in FIG. 9. The consumer shopper program 70 starts the main user interface operation at step 201. The main user interface displays either all the consumer preselected specials (i.e., list of advertisement) for either merchant stores or category advertisements, list of merchant store advertisements or list of ideas (i.e., a favorites list) on the main user interface menu at step 202.

The list of ideas is an easy, flexible way for the consumer to maintain shopping of purcharias lists, wish lists, etc. The list of ideas is a tabbed dialogue of lists the consumer wishes to maintain. Initially, only a new list "tab" will exist. When this is selected, either by clicking or adding an item, a rename dialogue will pop up asking the consumer for the desired name of this list. A new tab with this name will be created and the new list tab will shift to the right. With the exception of a new list tab "tab," the tabs will be sorted in alphabetical order. If more tabs are created than can fit on the screen, arrows will appear on the left with a "<" or on the right with a ">" as needed to allow shifting to tabs not visible. The tabs will always be within one row, i.e., they should not be stacked. The list of ideas helps the consumer to become comfortable with the idea of retaining items in preparation for future action. The list of ideas also provides for the use of a list as a local "gift registry" with the ability to e-mail the list to others.

A list will contain the following items:

1. A check box to indicate whether or not an item has been purchased. This box serves as a way to keep a log within the user/browser area.

2. Notes, including the consumer's own brief note regarding this item. This field is intended to allow flexibility for recording items as seen in the physical store.

3. Location, wherein the preferred embodiment utilizes a URL where the item was found. It may also be possible to include other non-URL location information here, in case of an item being available at a local physical store.

4. The cost of the item will also be included in the list.

5. Notes for any additional information that the consumer wants to retain is also included. It is possible to drag and drop web pages into this second notes attachment field. The notes attachment should also support clip board cut and paste.

The list of ideas is an icon on a browser bar that brings a consumer to the ideas area with no filtering. The first time to the ideas area, the left list tab will be active, i.e., positioned in front. On subsequent visits to this list of ideas, the last used list will be displayed and active.

Moving through the list to a merchant site can be done in the following ways. First, it can be accomplished by clicking on a tab that brings a list forward. As mentioned earlier, if a tab is a new list, then the process of creating a new list will automatically be initiated. Another way to move through the list of ideas is by clicking on a list item that selects another item. A third way to move through the list is by clicking on the location field which jumps to a merchant page. In the preferred embodiment, a URL is used to jump to a merchant page, thereby replacing the current area with the merchant page. Another method of navigating through the list of ideas is by selecting (clicking on) the notes icon that is made available (pops up) with the notes dialog. If a note does not exist, then it is created when clicked upon. The list of ideas also includes the ability to select a find button to bring a find dialog up for consumer interaction. The lists can then be searched by store name, catalog description, keywords, and/or text description. If there are multiple matches on a given search, the first item found is highlighted (with the list moved forward, if necessary). Utilizing the find button again can then be selected via a right click on a mouse button to jump to the next matched item. If no items match a consumer search, then a dialog box is displayed indicating this situation.

The user also has the ability to print a list of ideas. This feature allows for a list to be sent to a printer or saved to a text or other possible formats file. The list could then be sent via e-mail or other means to another person as a gift wish list. This allows the list to act as a local gift registry as noted previously on numerous different functions that can be utilized for a wish list of ideas. The wish list may allow searching as previously defined, adding an item to a list, or adding a last item to the list to display the last item added. The list of ideas may be deleted in its entirety or just a specific item within a list may be deleted. An entire list may be renamed or an item may be renamed. The cut and paste feature is also supported for an entire list or an individual item. The utilization of these lists will be shown herein with regard to FIGS. 13 and 16.

The main user interface next checks if the consumer has selected a specific merchant advertisement for display at step 203. If the consumer has not selected a specific merchant for display at step 203, then the main user interface checks if the user has selected a specific advertisement at step 204. If the consumer has selected either a specific merchant advertisement or specific advertisement to be displayed in steps 203 or 204, the main user interface captures the statistical information with regard to each merchant advertisement or category advertisement viewed by the consumer at step 205. After the consumer browser has captured the statistical information for the specific advertisement selected in steps 203 and 204, the browser next inquires if there are more advertisement displays to be selected at step 206. When the consumer indicates that more advertisements are to be displayed, the process then returns to step 202 to allow the consumer to select the next desired merchant or specific advertisement. If the consumer has indicated that no more advertisements are being selected, or if no advertisements were selected in steps 203 and 204, the consumer browser then proceeds to step 209 to run the standard browser interface.

Figure 20:
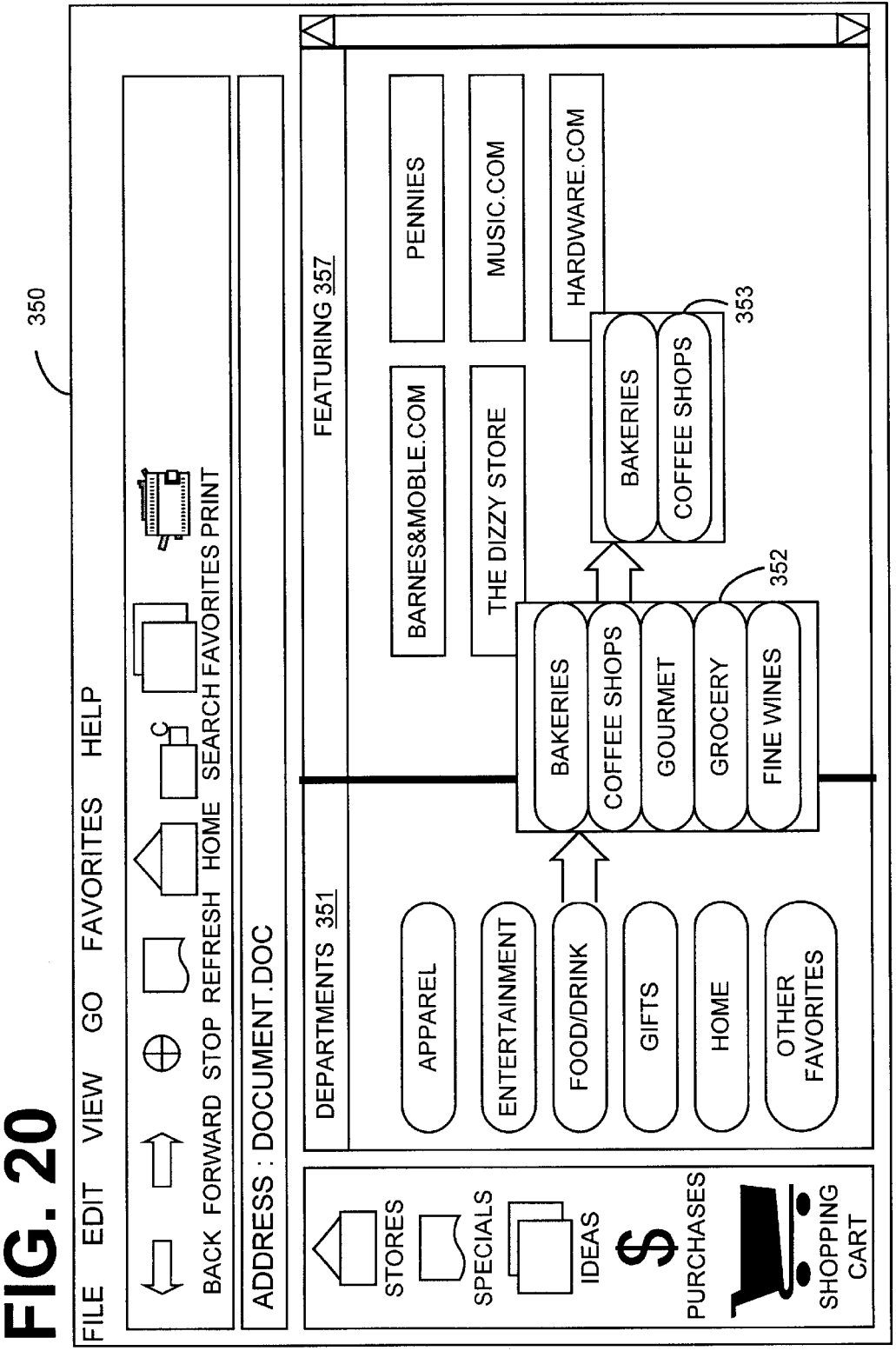
FIG. 20 is an illustration of an example screen display for store products as referenced in FIG. 13.
Figure 21:
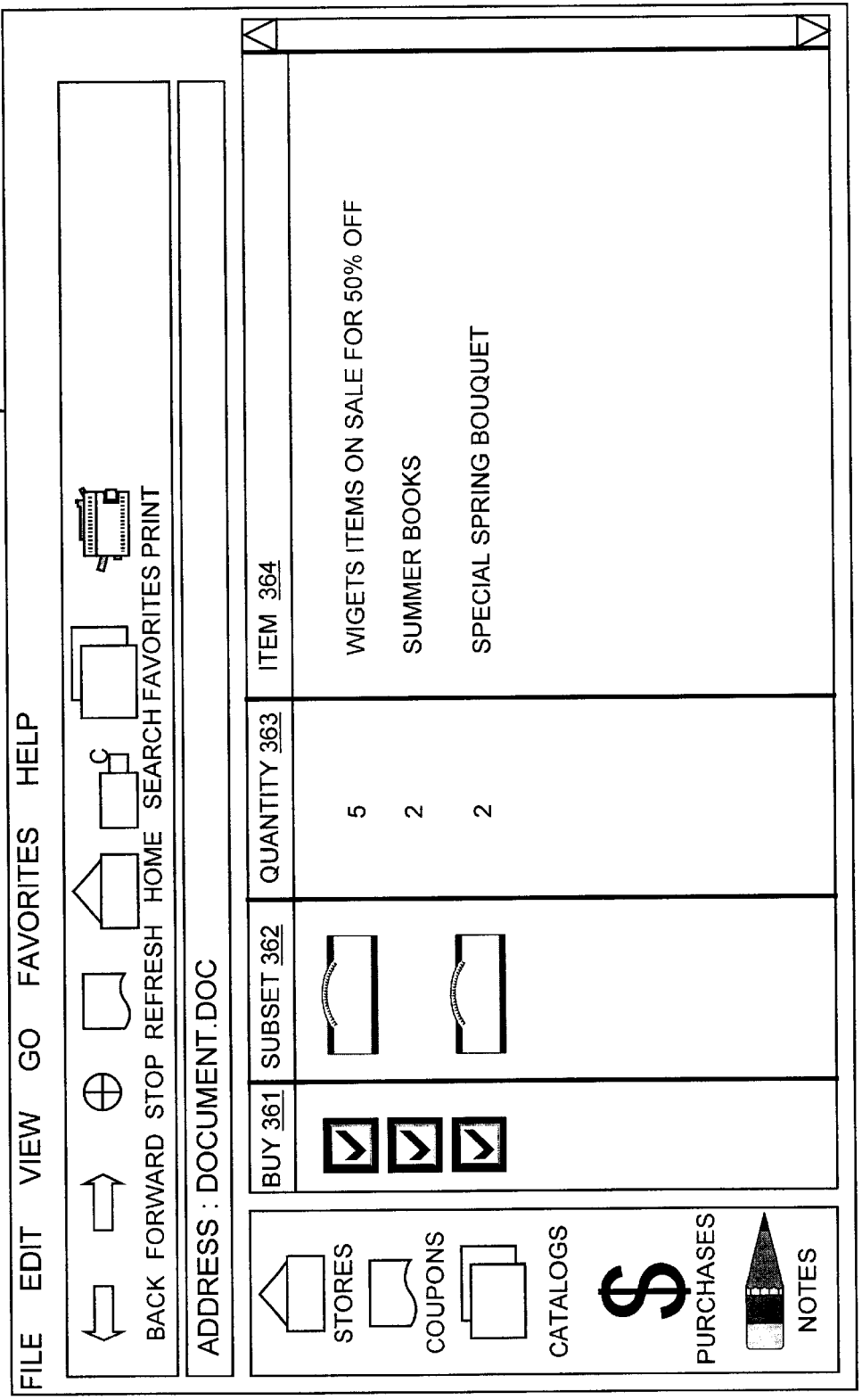
FIG. 21 is an illustration of an example screen display for a catalog list as referenced in FIG. 16.
Figure 22:
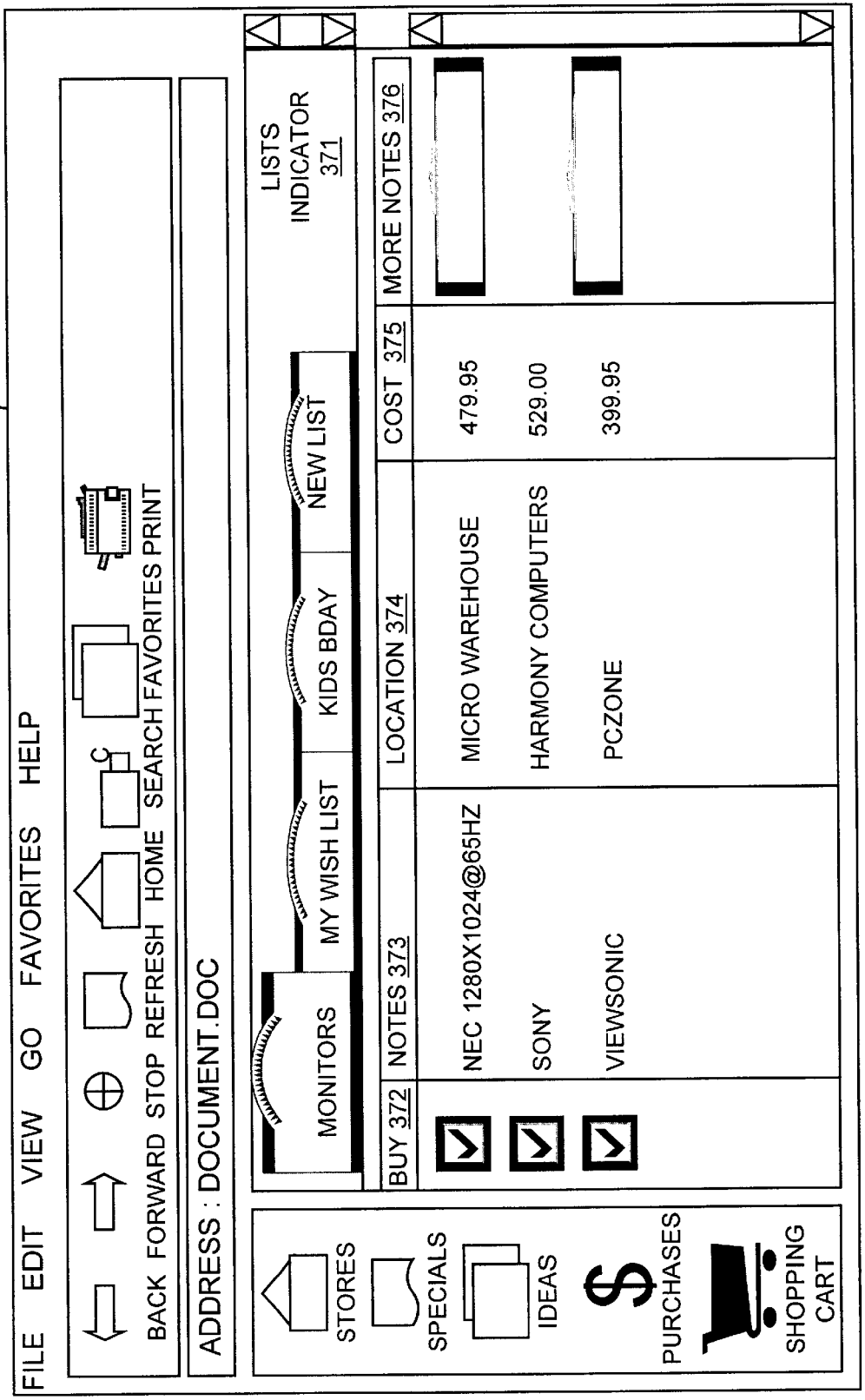
FIG. 22 is an illustration of an example screen display for purchase list as referenced in FIG. 16.

Illustrated in FIG. 13 is a flow diagram of the main user interface 210 for the consumer shopper program 70 of the present invention, referenced in FIG. 10 at step 189. The client browser 65 starts the main user interface 210 of the consumer shopper program 70 at step 211. The main user interface 210 provides the browse capability to the consumer. The browse capability enables the consumer to browse advertisements as illustrated in FIG. 19, the stores as illustrated in FIG. 20, shopping lists (i.e. catalogs) as illustrated in FIG. 21, lists of ideas as illustrated in FIG. 22, and lists of available coupons on the main user interface 210 with the client browser 65 at step 212. After a user makes a selection at step 212, the main user interface 210 checks to see if the user has requested to view an advertisement at step 213. If the user has requested to review an ad, the main user interface 210 proceeds to step 214 to perform the user view advertisement procedure 230 hereindefined in further detail with regard to FIG. 14 at step 214.

If the user did not select to view an advertisement at step 213, the main user interface 210 checks if the user has selected interaction with the wallet procedure 250 at step 215. If the user has requested a procedure 250 at step 215, the main user interface 210 performs the wallet procedure 250 at step 216, hereindefined in further detail with regard to FIG. 15.

When the user has not selected the wallet procedure 250 at step 215, the main user interface 210 checks if the user has selected interaction with the purchase list procedure 270 at step 217. If the user has selected interaction with the purchase lists, the main user interface 210 performs the purchase list procedure 270 at step 218 hereindefined in further detail with regard to FIG. 16.

If the consumer has not selected interaction with the purchase list procedure 270 at step 217, the main user interface 210 checks if the shopping cart procedure 290 has been selected at 221. If the shopping cart procedure 290 has been selected at step 221, the main user interface 210 performs the user shopping cart procedure 290 at step 222, hereindefined in further detail with regard to FIG. 17.

If the user has not selected the shopping cart procedure 290 at step 221, the main user interface 210 checks if the user has selected a buy procedure 310 at step 223. If the user has selected a buy procedure 310 at step 223, the main user interface performs the user buy procedure 310 at step 224, hereindefined in further detail with regard to FIG. 18.

If the user has not selected the buy procedure 310 at step 223, the main user interface checks if the user has selected the exit function at step 228. When the user has not selected the exit function at step 228, then the main user interface returns to step 212 to continue the browsing function within the consumer shopper program 70. If the user has requested to exit the consumer shopper program 70 at step 228, the main user interface 210 exits the consumer shopper program 70 and runs the standard browser interface at step 229.

Illustrated in FIG. 14 is a flow diagram of the view advertisements process 230 in the consumer shopper program 70 of the present invention referenced in FIG. 13 at step 224. The consumer shopper program 70 starts the user view advertisement process 230 at step 231. An illustration of an example of an user view advertisement screen display for the merchant advertisements is shown in FIG. 19. The view advertisement process checks if the user has selected a store or specific advertisement for viewing at step 232. If the user has indicated the desire to view advertisements from a store or a specific advertisement at step 232, the user view advertisements process 230 displays the store specific advertisement selected at step 233. An illustration of an example of a specific store advertisement screen display is shown in FIG. 19. The example illustrates a store advertisement display 340 for "Summer Book Blast" for the store "barnesandnoble.com".

During the display of the store or specific advertisement, the user view advertisement process 230 captures information for each advertisement selected by the user. The consumer shopper program 70 captures for each merchant ID advertisement and each category ID advertisement, the time that the advertisement was viewed by the consumer user in addition to other statistical information captured each time the advertisement is viewed by the consumer. The statistical information captured for each advertisement viewed by the consumer includes, but is not limited to, the number of times each advertisement for each merchant in a category is seen, the number of times each advertisement for each merchant in each category is seen, the percentage of advertisements viewed, the total amount of time spent viewing the advertisements, what time period of the day the advertisement is viewed, and the number of times the user has clicked on an advertisement to obtain further information from the merchant website 26. After the user has stopped the selection of advertisements to be viewed, the user view advertisement 230 process then checks if the user has selected the get coupon process at step 234.

If the user has selected the get coupon process at step 234, the user view advertisements process 230 captures for each coupon selected the user ID, the coupon ID, the coupon get date and time stamp, and the coupon redeem date and time stamp, at step 235. The user view advertisements process 230 then stores the coupon data on the user system 12 for further process during the purchase and redemption process hereindefined with further detail in FIGS. 17 and 18. The user view advertisements process 230 then acquires the next user selection at step 247 and repeats the user view add process starting at step 232.

If the user did not select the get coupon process at step 234, the user view advertisements process 230 then checks if the user has selected to add an item to the purchase list at step 236. If the user has selected to add an item to a purchase list at step 236, the user view advertisements process 230 then adds the item to the purchase list at step 237 which is hereindefined in further detail with regard to FIG. 16. After the item has been added to a purchase list, the user view advertisements process 230 then acquires the next user selection at step 274 and repeats the loop processing at step 232.

If the user has not selected to add an item to a purchase list at 236, the user view advertisements process 230 then checks if the user has selected to add an item to a shopping cart at step 241. If the user has selected to add an item to a shopping cart at step 241, the user view advertisements process 230 then adds the item to the shopping cart at step 242, which is hereindefined in further detail with regard to FIG. 17. The user view advertisements process 230 then acquires the next user selection at step 247 and continues loop processing at step 232.

If the user has not selected to add an item to a shopping cart at step 241, the user view advertisements process 230 then checks if the user has selected to display more advertisements at step 234. If the user has selected to display more advertisements at step 234, the user view advertisements process 230 then browses the store's coupons and adds on the main user interface at step 244 and allows the user to make his next selection at step 247 and continue processing at step 232. If the user has not requested to display more advertisements at step 243, the user view advertisements process 230 then exits the user view advertisements process 230 at step 249 and returns to the main user interface 210 at step 214.

Illustrated in FIG. 15 is a flow diagram of the user wallet process 250 for the consumer shopper program 70 of the present invention. The client browser 65 starts the user wallet process 250 at step 251. The consumer shopper program 70 checks if the user has selected to add a new user at step 252.

If a new user addition was selected at step 252, the consumer shopper program 70 then requests user information, including the user name, location, limit, and payment method including card number, expiration date, name on card, etc., at step 253. The user wallet process 250 then validates the user information at step 255. The user information validated at step 255 is then written to the administrative payment server at step 256 and the user wallet process 250 returns to continue the loop process at step 252. The administrative payment server is normally implemented on the user system 12. However, the administrative payment server can be implemented on a separate computer in a network, such as for example but not limited to: the user systems 13, 14 or 15; network server 21; or the commerce server 23.

If the user did not elect to add a new user at step 252, the user wallet process 250 then checks if the user has requested to edit user information at step 254. If the user has elected to edit user information at step 254, the user wallet process 250 requests that a user ID number be input at step 257. The user wallet process 250 then displays the user information for the user ID at step 258. After the user wallet process 250 has displayed the user information at step 258, the user wallet process 250 checks if the user has selected to delete a uses at step 261. If the user has selected to delete a user at step 251, the user wallet process 250 proceeds to step 262 to delete the user information from the administrative server database and then returns to step 252 to continue processing. If the user has not elected to delete a user at step 261, the user wallet process 250 allows the user to update the user information at step 263. The user wallet process 250 then validates the user information at step 264 and writes the validated user information to the administrative payment server at step 265. The user wallet process 250 then returns to step 252 for further processing.

If the user has not elected to edit user information at step 254, the user wallet process 250 proceeds to step 266 to see if the user wallet process 250 is done. If the user has selected done, the user wallet process 250 exits the user wallet process at 269. If the user has not selected done at 266, then the user returns to step 252 to continue processing.

Illustrated in FIG. 16 is a flow diagram of the consumer purchase list process 270 for the consumer shopper program 70 of the present invention.

The user purchase list process 270 first checks if the user has elected to mail a purchase list at step 272. If the mail purchase list was selected at step 272, the user purchase list process 270 requests the title for the purchase list elected for mailing at step 273. The user purchase list process 270 encapsulates the selected list via the mime processing and mails the encapsulated list/FTP or otherwise transmits the selected purchase list to another user including the date and time that the list was mailed at step 273. The user purchase list process 270 then returns to continue processing at step 272. If mailing a purchase list was not selected at step 272, the user purchase list process 270 checks if a purchase list was received at step 274.

If a purchase list was received at step 274, the user purchase list process 270 verifies that the title of the purchase list received exists at step 277. If the title purchase list exists, the user purchase list process 270 matches the list mailed to the recipients and updates the purchase list if the purchase list currently contained by the consumer shopper program 70 is older. The user purchase list process 270 then returns to step 272 for further processing. If a purchase list was not received at step 274, the user purchase list process 270 then checks if the user has selected to publish a purchase list at step 281.

If the user has elected to publish a purchase list at step 281, the user purchase list process 270 requests a title for the purchase list selected at step 282. The user purchase list process 270 then converts the named purchase list to HTML and transmits the title HTML list to a web server including the date and time that the HTML purchase list was sent. The user purchase list process 270 then mails/transmits a URL to the indicated users. The user purchase list process 270 then returns to step 272 for continued processing. If the user has not elected to publish a purchase list at step 281, then the user purchase list process 270 then checks if a products item was selected at step 283.

If a product item was selected at step 283, then the user purchase list process 270 captures the product item information for each selection in a purchase list. The information captured includes the purchase list name, the merchant ID and the time stamp category ID and time stamp, the product item ID, the product item description, and the like, at step 284. If the user did not elect to add a product item to a purchase list at step 283, the user purchase list process 270 then checks if the user the has elected to display more product items at step 285.

If the user has elected to select more product items at step 285, the user purchase list process 270 provides the ability for the user to browse stores, coupons, and advertisements on the main user interface at step 286. The user purchase list process 270 then returns to step 272 for continued processing. If the user has not elected to display more products items at step 285, the user purchase list process 270 is exited at step 289 and process returns to step 218 in FIG. 13.

Illustrated in FIG. 17 is a flow diagram of the user shopping cart process 290 of the consumer shopper program 70. The user shopping cart process 290 is started by the client browser 65 at step 291. The user shopping cart process 290 allows the user to browse stores, coupons, and advertisements on the main user interface at step 292. Once an item is selected during step 292, the user shopping cart process 290 checks if the user has selected to buy an item at step 293.

If the user has elected to buy an item, the user shopping cart process 290 extracts the item ID, item description, price, SKU, quantity of items to be purchased, the merchant ID supplying the item, advertisements and other information of the like, and adds the item information to the shopping cart list at step 294. The user shopping cart process 290 then returns to step 292 for further browsing. If the user has not elected to buy an item at step 293, the user shopping cart 290 then checks if the user has elected to get a coupon at step 295.

If a user has elected to get a coupon, the user shopping cart process 290 has a coupon selected to the user coupon file at step 296. The coupon information includes the coupon ID, the get date of the coupon, and the redemption or expiration date of the coupon. The user shopping cart 290 then returns to step 292 for further processing. If the user has not elected to get a coupon at step 295, the user shopping cart process 290 then checks if the user has elected to clear an item from a shopping cart list at step 301.

If the user has elected to delete an item from the shopping cart at step 301, the item indicated is deleted at step 302 and the process returns to step 292 for continued processing. When the user has not elected to delete an item from a shopping cart at step 301, the user shopping cart process 290 then checks if the user has elected to print a shopping cart list at step 303.

If the user has elected to print a shopping cart list, the user shopping cart process 290 prints the indicated shopping list at step 304 and returns to step 292 for further processing. If the user has not elected to print a shopping cart list at step 303, the user shopping cart process 290 then checks if the user has elected to buy an item at step 305.

When the user has elected to buy an item, the user shopping cart 290 proceeds to step 306 to buy the indicated item. The process to buy an item is hereindefined in further detail with regard to FIG. 17. Once the item is purchased, the process then returns to step 292 for continued processing. If the user has not elected to buy an item at step 305, the user shopping cart process 290 then checks if the user has selected to exit the shopping cart at step 307.

If the user has not elected to exit the shopping cart process 290 at step 307, the user shopping cart process 290 returns to step 292 for further processing. If the user has elected to exit the user shopping cart 290 at step 307, the user exits the shopping cart process at step 309 and returns to step 222 in FIG. 13 for continued processing.

Illustrated in FIG. 18 is a flow diagram of the consumer purchase process 310 for the consumer shopper program 70 of the present invention. The consumer browser 65 initializes the user buy process 310 at step 311. The user buy process 310 connects to the customer payment server to verify payment information, limits and user passwords at step 312. The user buy process 310 checks if the password entered was okay at step 313. If the password was not okay, the user buy process 310 then exits the user buy process 310 at step 329. If the check of the user password at step 313 is satisfactory, the user buy process 310 checks if the payment amount input at step 312 exceeds the spending unit of the user at step 314. If the spending limit for the user is exceeded at step 314, the user buy process 310 proceeds to step 329 to exit the user buy process. If the user has not exceeded the spending limits at step 314, the user buy process 310 then checks if the user has elected to redeem a coupon with a purchase at step 315. If the user has elected to redeem a coupon with a purchase, the user buy process 310 then redeems the coupon associated with the item with a coupon on a user system at 316. In either case, the user buy process 310 transmits a buy request to the merchant including the item and coupon information at step 321.

The user buy process 310 then waits to receive a buy summary from the merchant at step 322. The summary received from the merchant includes a request for payment information. This payment information requested by the merchant is then provided to the wallet function at step 323. The wallet establishes a secure protocol with the merchant system and transmits the requested payment information at step 324. It is also contemplated by the applicants that other payment type processes could be utilized instead of the MS wallet function as hereindefined. The merchant 26 then notifies the coupon registry that a user with a particular user ID is redeeming a coupon with a particular coupon ID. The coupon registry then creates a log item that documents the redemption of a particular coupon for a particular item by a particular consumer.

The user buy process 310 then checks if more items are to be purchased at step 326. If more items are to be purchased, the user buy process 310 then allows the user to browse the merchant advertisements, product listings or shopping cart for the next item to be purchased at step 327 and returns to step 312 for further processing. If the user has elected not to buy more items at step 326, the user buy process 310 then exits at step 329.

Illustrated in FIG. 19 is an example of a screen display for advertisements list 340. The advertisements list 340 displays advertisement items currently available from stores that the shopper has subscribed to. Each item in the list contains a store name 341, advertisement description 342, advertisement issue date 343 of the advertisement, and advertisement expiration date 344. Also illustrated in the merchant advertisement display 340 is the area for the currently selected advertisement 345. It is contemplated by the inventors that numerous other versions of merchant advertisement display 340 may contain similar or other types of information.

The advertisements list 340 can be sorted by the store name 341, advertisement description 342, advertisement issue date of the advertisement 343, and advertisement expiration date 344 fields. If there are more advertisements than can be seen in the available list 340, then a scroll bar is produced and displayed. The advertisements list 340 allows the shopper to scan through multiple advertisement descriptions at once, to quickly scan for advertisements of interest. The current advertisement item selection is shaded. Initially, only the advertisements list 340 is displayed, i.e., no advertisements content is displayed. This feature avoids downloads from the merchant site at undesired times and also allows the shopper to see a larger list before selecting an advertisement of interest.

The advertisements list 340 displays an actual advertisement from a merchant site. When an item in the advertisements list 340 is selected for display on terminal 46, the associated advertisement is retrieved and displayed. The advertisement is retrieved either locally, if it has already been downloaded, or from the merchant site using the URL. The size of the advertisements list content area will be the recommended size for an advertisement for optimal viewing and fast download, however, the advertisement can be larger than the content area. If an advertisement is larger than the advertisements list content area, scroll bars are generated and displayed.

The advertisement 345 overlays the advertisements list 340. If advertisement 345 content is not being displayed, the advertisement 345 fills the advertisements list 340 viewing area again. Once an advertisement 345 has been retrieved from the merchant site, it will be stored locally.

The intent of basic operation is to allow all the primary functions for viewing advertisements to be done with a single point and click. No menu pull-downs, mouse right-clicks, or drag and drops are required for these functions. The default behavior here is to only download advertisement content from a merchant server 26 on demand. Simply selecting (clicking on) the "Advertisements" icon brings the shopper to the advertisements area, with no filtering. The advertisement items are sorted by the current sort field. If the shopper is here for the first time, the first advertisement item in the list is highlighted. If the shopper was here previously in this session, it remembers where he/she left off. For example, if the shopper left "Nugget" and went to the "Barnes & Noble" site by clicking on one of the URL references in the advertisement, clicking on the "Advertisements" icon would bring him/her back to the same advertisement.

Moving through advertisements and to the merchant site can be done in several ways. First, clicking on an underlined advertisement description (URL) highlights the advertisement item and displays the corresponding ad. The advertisement is downloaded from the merchant server 26, if it has not been already.

Clicking outside this underlined advertisement description, e.g. in the date region, simply highlights the advertisement item. No advertisement content is displayed. This is to allow for selection to use the delete icon or as a placeholder, without triggering a download.

Clicking or moving within the scroll bar, on the right, scrolls through the advertisement items only, using standard scrolling behavior. The advertisement content area does not change during the scrolling of the advertisement items. The current advertisement remains selected and displayed until another advertisement item is selected.

Clicking on the up-arrow and down-arrow icons in the toolbar region moves line by line through the advertisement list, selecting advertisement items. As each advertisement item is selected, it is highlighted and the corresponding advertisement is displayed. The advertisement is downloaded if it is not already stored locally. The appropriate arrow is dimmed (made unavailable) when on the first or last advertisement item in the list.

Clicking on the Store bitmap in the advertisement list jumps to the merchant server 26. The advertisements functional area goes away and is replaced with the merchant's home page. This is the same behavior as in the Stores functional area.

Clicking on the X, in the upper right corner of the advertisement content, removes the advertisement content and replaces the area with the full advertisement list. The advertisement is not deleted.

Clicking on a URL within the merchant's advertisement also jumps to the merchant site. The advertisements functional area goes away and is replaced with the page referenced by the URL.

Clicking on the Advertisements icon in the band area brings the shopper back to the advertisements functional area.

Because the list of all stores could become very large, there is a find store feature that can be accessed from various pop-up menus and from the toolbar. A name can be typed in directly, or a name previously searched for can be selected from the combo box in which a list of the last 10 searches is kept in the order in which they were attempted. This means that the most recent search is found at the top. The search is case-insensitive. Wildcard characters or any kind of regular expression syntax are supported. All store names and keywords that stores have registered are searched. If there are multiple matches in a given search, store names are displayed first in the results list followed by store names returned as a result of registering a keyword that matched. In this results dialog, store names are alphabetized in these two sets. If no store matches the user's search, then a dialog box is displayed to notify the user.

Illustrated in FIG. 20 is an example screen display of store information during the browsing process of step 212 of FIG. 13. The illustration of the example store display 350 includes, but is not limited to, the department information 351 listing all of the individual departments within that can be searched for a particular store. The departments (or equivalent term) area 351 displays the first level of main categories. Selection of a category drills down to its subcategories, i.e. subcategories 352 and 353 respectively, until the stores level is reached. Categories and stores are not mixed within a level. These subcategories 351, 352 and 353 are searchable categories within the stores listed in the featured store area 357. At the lowest level is the stores list area 357. To show position within the category and stores lists, the selected items (e.g., Food & Drink, Coffee Shops) are shaded. It is contemplated by the inventors that there could be other information that may be displayed for each featured store.

Navigating through Stores and to the merchant site is done in the following ways. First, by clicking on a category icon pops up a subcategory list. Subcategory lists continue to pop up until the stores level is reached. When the mouse 44 moves over category or store names, a description pops up, similar to the "Favorites" menu in Internet Explorer. Another way is by moving the mouse 44 over a category, without clicking, also causes the next category level to pop-up. Clicking on a store icon jumps to the merchant's home page, replacing the Stores display area. The store icon can be in the featuring area or in a stores list within a category.

Illustrated in FIG. 21 is a screen display of an example shopping list 360. The shopping list screen display 360 includes a buy indicator area 361. While the example shows that text or checkmark may be entered into the buy are to indicate that an item is to be purchased, it is also contemplated that there may be various other types of methodology such as having a push button indicator or dialog box or the like. Also included in an example of the shopping list 360 is the indicator that the items are a subset of another shopping list. This indicator 362 communicates that the overall item category listed comprises a further shopping list. Also illustrated in the example shopping list 360 is the quantity of items desired. This quantity 363 is indicated for each item. The shopping list 360 also includes a textual description of each item desired. The item description 364 can indicate the item description as well as if the item is further comprised of another shopping list. It is also contemplated by the inventors that an item ID and price can also be included in the shopping list 360.

Illustrated in FIG. 22 is an example screen display of a purchase list 370 as referenced in FIG. 16. The purchase list display screen 370 includes a means to differentiate the different purchase lists by utilizing the purchase list indicator 371. Also, in the example screen for purchase lists is an indicator 372 for indicating whether or not an item is to be purchased or deleted. The purchase list display also includes a note area 373 in which to note the item to be purchased. The example purchase list display 370 further includes the location of where the item is to be purchased 374 and the cost of the item 375.

The purchase list 370 area displays a tabbed dialog of lists that the shopper wishes to maintain. Initially, only a "New List" tab will exist. When this is selected, either by clicking or adding an item, a Rename dialog will pop-up asking for the desired name of this list. A new tab with this name will be created and the "New List" tab will shift right. With the exception of the "New List" tab, the tabs will be sorted in alphabetical order. If more tabs are created than can fit on the screen, arrows will appear to the left (<) or right (>) as needed to allow shifting to tabs not visible. The tabs will always be within one row, i.e., they will not be stacked.

A list will contain the following items. Checkbox 372 indicates whether item has been purchased. This serves as a way to keep a purchase log within this area. Checking this box may trigger a move of this item to the Purchase Log. Note 373 are the shoppers own brief note regarding this item. This field allows flexibility, e.g. for recording items seen at a physical store. Location 374 is a URL where the item was found. It may also be possible to type other non-URL Location info here, in the case of a physical store. The cost 375 area is the cost of the item. Additional notes attachment 376 are provided for any additional information the shopper wants to retain. It is possible to drag and drop web pages to this. The notes attachment supports clipboard cut and paste.

A purchase log can be created for items that have already been purchased. This may be wrapped in with the purchase lists 370 area, e.g. a separate tab for purchases or a flag that indicates an items has been purchased, with a notes attachment for receipts, etc. The Purchase Log will retain information about which credit card was used, receipts, merchant details, contact data, etc.

Clicking on the "Ideas" icon in the Shopper bar brings the shopper to the purchase lists 370 area, with no filtering. The first time to this area, the leftmost list tab will be active (positioned in front). On subsequent visits to this area, the last list used will be active.

Moving through lists and to the merchant site is done in the following ways. First, by clicking on a tab brings its list forward. As mentioned earlier, if the tab is "New List", the process of creating a new list will automatically be initiated. Secondly, clicking on a list item selects that item. Data can then be entered or the item can be deleted, moved to the purchase log when available, etc. Clicking on a Location URL jumps to that merchant page, replacing the current area with the merchant page. Clicking on the notes icon pops up the notes dialog. If a note does not exist, it is created.

Clicking the Find button (or selecting Find through a popup menu), brings up the Find dialog, similar to the Find dialogs found in the other function areas. The lists can be searched by store name and/or text description.

The search is case-insensitive. Wildcard characters and any kind of regular expression syntax are supported. If there are multiple matches in a given search, the first item found is highlighted (with its list moved forward if necessary). "Find Again" can then be selected via a right click popup to jump to the next matched item. If no items match the user's search, a dialog is displayed indicating this.

Clicking the Print button in the toolbar brings up a dialog for printing or exporting data. This allows for a list to be sent to a printer or saved to a text (or other possible formats) file. The text list can then be sent via email to another person as a gift wish list. This allows the list to act as a local "Gift Registry". The feature may be added to directly send the list via email.

Illustrated in FIG. 23 is an example display of the purchase 380 screen. The purchase screen 380 includes a notation area 381 to indicate whether or not the item is currently being purchased, is in transit, or a like notation. The date that each item was purchased is indicated in the purchase list date area 382. This purchase date 382 allows the consumer to verify the purchase date. The merchant that an item is being purchased from is indicated in the merchant area 383. While the merchant area 383 is depicted as a text description, it is also contemplated by the inventors that an alternative would be to display a merchant ID instead of, or in combination with, the text merchant identification. Also contained within the example purchase screen 380 is the amount of each item to be purchased. The amount area 384 indicates the total amount of the purchase from a particular merchant. As shown in the description area 385 is a description of the items that are being purchased. It is also contemplated by the inventors that instead of or in addition to the text description that a product ID could also be utilized. The credit card area 386 indicates what payment method was utilized for a particular purchase transaction.

Figure 24:
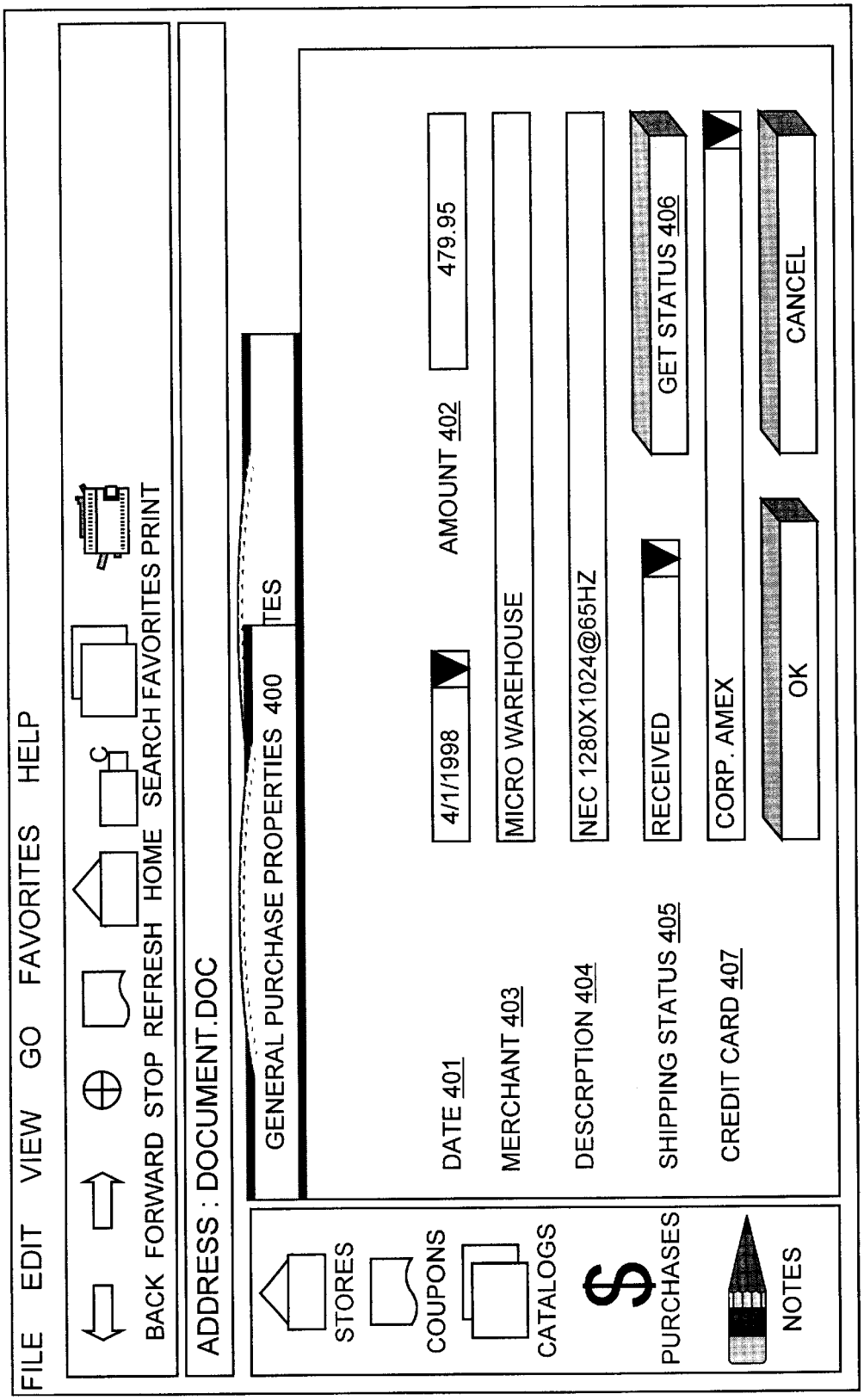
FIG. 24 is an illustration of an example screen display of the consumer purchase process as referenced in FIG. 18.

Illustrated in FIG. 24 is an example of the purchase property screen display 400. The purchase property display 400 includes the date 401 that an item was purchased and the total amount 402 of the purchase. Area 403 indicates the textual name of the merchant, however, it is contemplated by the inventors that a merchant ID may be utilized in conjunction with, or instead of, the text description of the merchant. Illustrated in description 404 is the description of the items being purchased. While the overall description may be displayed in the description area 404, it is also contemplated by the inventors that a product ID or other code may be used in combination or instead of the textual description. Illustrated in shipping status area 405 is the status of the transaction. It is also contemplated by the inventors that the text of the status description may be utilized in combination or instead of a status ID. The example purchase properties screen display 400 may also include an indicator for the user to request a status check of a particular purchase transaction. It is contemplated that this status display indicator 406 may be a dialog screen user input or the like. Illustrated in the example purchase properties screen 400 is the payment method area 407. The payment area 407 generally contains a textual description of the credit card, however, it may include other references to other types of payment.

Figure 25:
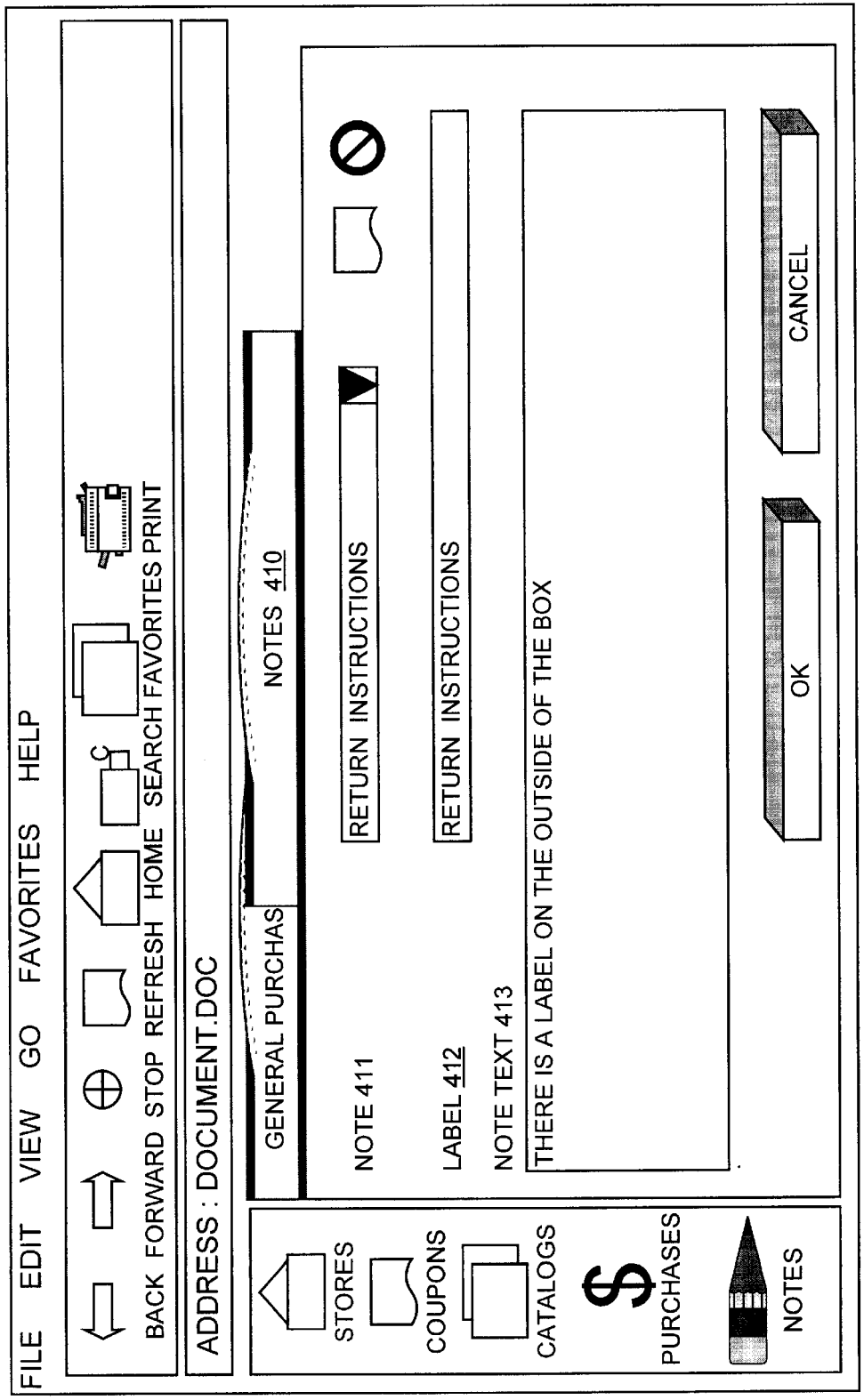
FIG. 25 is an illustration of an example screen display for the user purchase process notes as shown in FIG. 18.

Illustrated in FIG. 25 is the notes field of the example of the purchase property screen 400. The notes screen 410 includes a notes area 411 that indicates the type of notes to be documented. The inventors contemplate that there may be numerous different note types for a particular transaction. The notes includes a label 412 that indicates the textual description of the general topic of the textual notes listed in note area 413.

The consumer-to-merchant shopper system 70, which comprises an ordered listing of executable instructions for implementing logical functions, or its contained subroutines, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device.

The computer readable medium can be, but is not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method comprising:
  creating a plurality of purchase lists on a consumer device connected to a network, each purchase list comprising a wish list of items that a consumer desires;
  receiving on the consumer device an item advertisement from a non-merchant provider connected to the network, the item advertisement comprising a description of at least one item;
  receiving an input from a consumer to select an item desired for purchase, wherein the item desired for purchase is selected from the at least one item described in the item advertisement received from the non-merchant provider;

identifying one purchase list from the plurality of purchase lists;

saving the item desired for purchase on the identified purchase list;

allowing the consumer to identify a third party consumer with whom the identified purchase list is to be shared; and transmitting the identified purchase list from the consumer device to the identified third party consumer.

2. The method of claim 1, wherein receiving an item advertisement further comprises:

capturing item data for the at least one item, wherein the item data is selected from a group consisting of a product name, a product identification number, a product category, a vendor name, and a vendor identification number.

3. The method of claim 1, wherein receiving an item advertisement further comprises:

browsing the network for items, wherein the items browsed are selected from a group consisting of merchant products, coupons, product lines, and advertisements.

4. The method of claim 1, further comprising:

printing the identified purchase list.

5. The method of claim 1, further comprising:

converting the identified purchase list on the consumer device to an appropriate format for transmission to the third party consumer.

6. The method of claim 5, wherein converting the purchase list further comprises:

encapsulating the purchase list on the consumer device using multipurpose internet mail extensions (MIME).

7. The method of claim 5, wherein converting the purchase list further comprises:

converting the purchase list on the consumer device into a hypertext markup language (HTML) document.

8. The method of claim 1, further comprising:

receiving an updated purchase list on the consumer device from the third party consumer.

9. The method of claim 8, further comprising:

updating the purchase list on the consumer device with the updated purchase list received from the third party consumer.

10. The method of claim 1, further comprising:

indicating to the consumer if an item on the purchase list is purchased by the third party consumer.

11. A consumer system connected to a network, the consumer system comprising:

means for receiving input from a consumer to create a plurality of purchase lists on the consumer system, each purchase list comprising a list of items that a consumer desires for purchase;

means for receiving via the network an item advertisement from a non-merchant provider, the item advertisement comprising a description of at least one item;

means for selecting an item desired for purchase, wherein the item desired for purchase is selected from the at least one item described in the item advertisement received from the non-merchant provider;

means for identifying, from the plurality of purchase lists, a purchase list on which to save the selected item;

means for receiving an input from the consumer to identify a third party consumer with whom the identified purchase list is to be shared; and means for receiving an initiation input from a consumer to transmit the identified purchase list from the consumer system to the identified third party consumer.

12. The system of claim 11, wherein the means for receiving further comprises:

means for capturing item data for the at least one item, wherein the item data is selected from a group consisting of a product name, a product identification number, a product category, a vendor name, and a vendor identification number.

13. The system of claim 11, wherein the means for receiving an item advertisement further comprises:

means for browsing the network for items, wherein the items browsed are selected from a group consisting of merchant products, coupons, product lines, and advertisements.

14. The system of claim 11, further comprising:

means for printing the identified purchase list.

15. The system of claim 11, further comprising:

means for converting the identified purchase list on the consumer device to an appropriate format for transmission to the third party consumer.

16. The system of claim 15, wherein the converting means further comprises:

means for encapsulating the purchase list on the consumer device using multipurpose internet mail extensions (MIME).

17. The system of claim 15, wherein the converting means further comprises:

means for converting the purchase list on the consumer device into a hypertext markup language (HTML) document.

18. The system of claim 11, further comprising:

means for receiving on the consumer device an updated purchase list from the third party consumer.

19. The system of claim 18, further comprising:

means for updating the purchase list on the consumer device with the updated purchase list received from the third party consumer.

20. The system of claim 11, further comprising:

means for indicating if an item on the identified purchase list is purchased by the third party consumer.

21. A network-connected consumer device comprising:

a plurality of purchase lists, each purchase list comprising a list of items that a consumer desires;

a first consumer mechanism that receives an item advertisement from a network-connected non-merchant provider, the item advertisement comprising a description of at least one item;

a second consumer mechanism that receives an input from a consumer to select an item desired for purchase, wherein the item desired for purchase is selected from the at least one item described in the item advertisement received from the network-connected non-merchant provider;

a third consumer mechanism that receives an input from the consumer to identify from the plurality of purchase lists a purchase list on which the selected item is to be saved;

a fourth consumer mechanism that receives a consumer input identifying a third party consumer with whom the identified purchase list is to be shared; and a fifth consumer mechanism that transmits the identified purchase list to the identified third party consumer.

22. The consumer device of claim 21, wherein the first consumer mechanism further comprises:

a capturing mechanism that captures item data for the at least one item, wherein the item data is selected from a group consisting of a product name, a product identification number, a product category, a vendor name, and a vendor identification number.

23. The consumer device of claim 21, wherein the first consumer mechanism further comprises:

a browsing mechanism that enables the consumer to browse the network for items, wherein the items browsed are selected from a group consisting of merchant products, coupons, product lines, and advertisements.

24. The consumer device of claim 21, wherein the consumer device further comprises:

a print mechanism that prints the identified purchase list.

25. The consumer device of claim 21, wherein the consumer device further comprises:

a conversion mechanism that converts the identified purchase list on the consumer device to an appropriate format for transmission to the third party consumer.

26. The consumer device of claim 25, wherein the conversion mechanism further comprises:

a list encapsulation mechanism that encapsulates the purchase list on the consumer device using multipurpose internet mail extensions (MIME).

27. The consumer device of claim 25, wherein the conversion mechanism further comprises:

a mechanism that converts the purchase list on the consumer device into a hypertext markup language (HTML) document.

28. The consumer device of claim 21, further comprising:

a receiving mechanism that receives an updated purchase list on the consumer device from the third party consumer.

29. The consumer device of claim 28, further comprising:

a list update mechanism that updates the purchase list on the consumer device with the updated purchase list received from the third party consumer.

30. The consumer device of claim 21, further comprising:

a list indicator mechanism that indicates to the consumer if an item on the purchase list is purchased by the third party consumer.

\* \* \* \* \*